US008216466B2

(12) United States Patent
Bassett et al.

(10) Patent No.: US 8,216,466 B2
(45) Date of Patent: Jul. 10, 2012

(54) COUNTER TOP WATER FILTRATION SYSTEM

(75) Inventors: Laurence W. Bassett, Killingworth, CT (US); Timothy B. Carney, Madison, CT (US); Robert E. Astle, Middlefield, CT (US); Hemang R. Patel, Wallingford, CT (US); Dian Zheng, Middletown, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 1118 days.

(21) Appl. No.: 11/239,607

(22) Filed: Sep. 29, 2005

(65) Prior Publication Data

US 2006/0065607 A1    Mar. 30, 2006

Related U.S. Application Data

(60) Provisional application No. 60/614,316, filed on Sep. 29, 2004.

(51) Int. Cl.
*B01D 29/96*    (2006.01)
*B01D 25/02*    (2006.01)
*B01D 29/00*    (2006.01)

(52) U.S. Cl. ........ 210/238; 210/806; 210/237; 210/232; 210/321.87; 210/342

(58) Field of Classification Search .............. 210/87, 210/321.87, 321.88, 321.89, 342, 238, 237, 210/232, 234
See application file for complete search history.

(56) References Cited

U.S. PATENT DOCUMENTS

| | | | |
|---|---|---|---|
| 3,533,509 A * | 10/1970 | Kudlaty | 210/240 |
| 4,487,691 A * | 12/1984 | Panora | 210/167.28 |
| 4,555,337 A * | 11/1985 | Gargas | 210/238 |
| 5,078,876 A | 1/1992 | Whittier et al. | |
| 5,128,034 A | 7/1992 | Kool | |
| 5,151,180 A * | 9/1992 | Giordano et al. | 210/264 |
| 5,275,213 A * | 1/1994 | Perkins | 141/59 |
| 5,529,201 A * | 6/1996 | Tallent et al. | 220/298 |
| 5,695,633 A | 12/1997 | Ernst et al. | |
| 5,888,381 A | 3/1999 | Primdahl et al. | |
| 6,051,144 A | 4/2000 | Clack et al. | |
| 6,120,685 A * | 9/2000 | Carlson et al. | 210/232 |
| 6,149,801 A * | 11/2000 | Giordano et al. | 210/87 |
| 6,325,929 B1 | 12/2001 | Bassett | |
| 6,602,412 B2 | 8/2003 | Garber | |
| 6,627,078 B1 | 9/2003 | Wagner et al. | |
| 2003/0222010 A1* | 12/2003 | Bassett et al. | 210/312 |
| 2004/0129617 A1 | 7/2004 | Tanner et al. | |

FOREIGN PATENT DOCUMENTS

| | | |
|---|---|---|
| EP | 0 880 986 | 12/1998 |
| WO | WO 03/037479 A1 | 5/2003 |
| WO | WO 2004/069373 A1 | 8/2004 |

* cited by examiner

*Primary Examiner* — Krishnan S Menon
*Assistant Examiner* — Katherine Zalasky

(57) ABSTRACT

The present disclosure relates to a new multi component counter top water filtration system having two filtration media cartridges, one media cartridge being replaceable at least twice before the second media cartridge exceeds its useful life and requires replacement and includes a mechanism for disengaging the o-rings associated with the operative connection of the inner filter media cartridge with the outer filter media cartridge without rotation thereof during replacement of the inner filter media cartridge and includes the separation of the plumbing and electronic components wherein the lower housing unit houses the plumbing components such as the water filtration pressure vessel, tubing and flow indication signaling device and the upper unit houses the electronics component and filtration methods related thereto and methods of operating same.

11 Claims, 27 Drawing Sheets

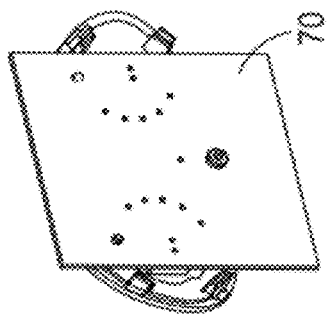
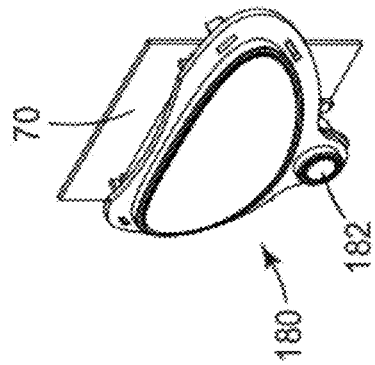
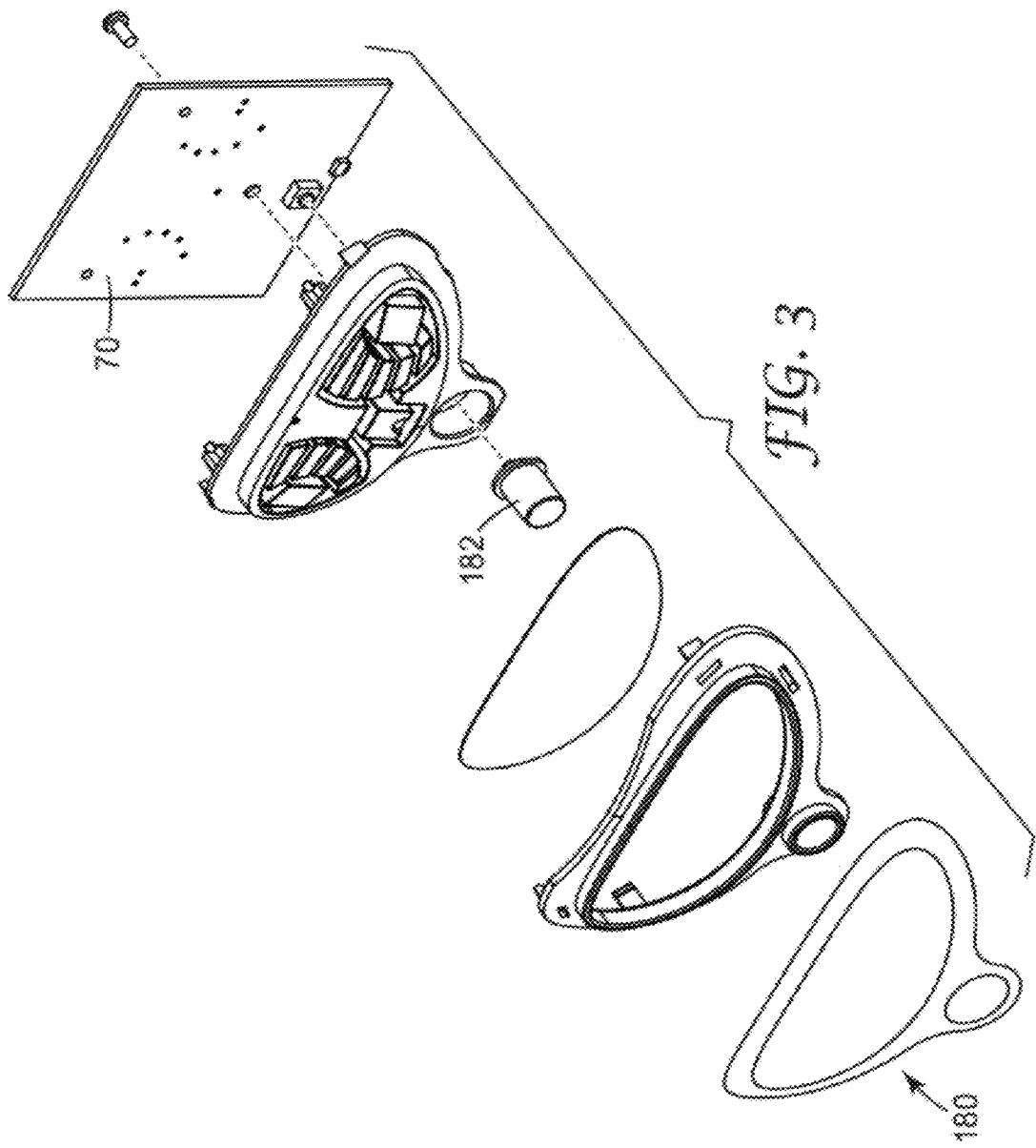

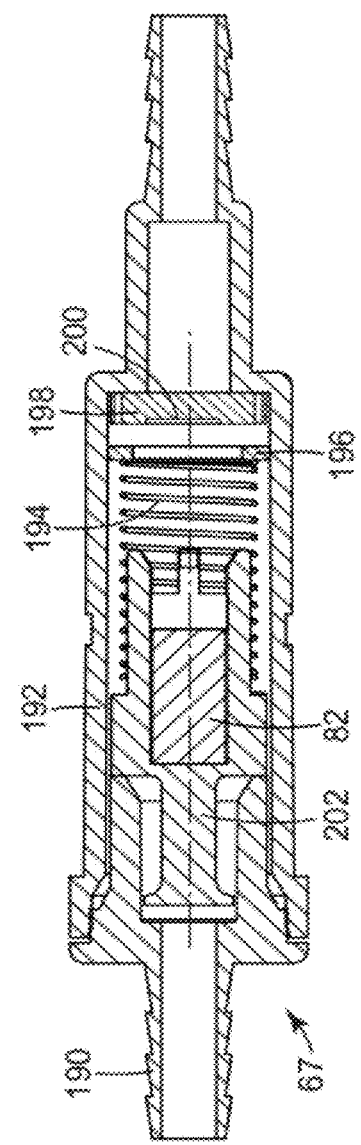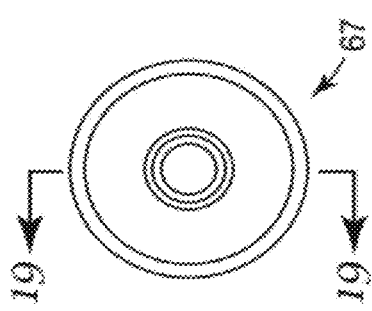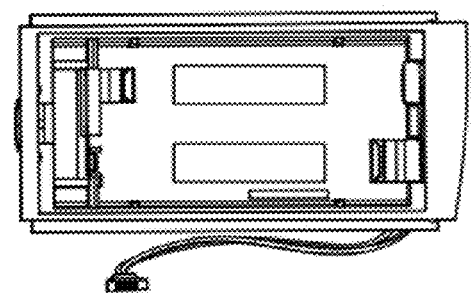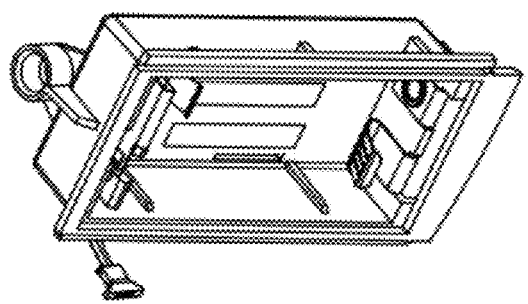

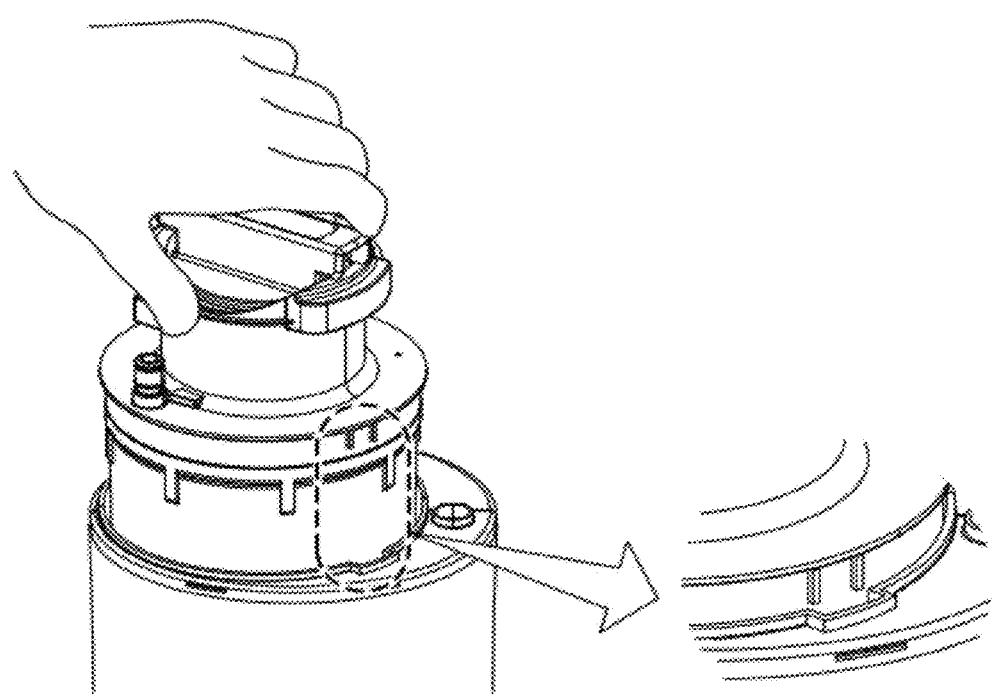
*FIG. 44A*  *FIG. 44B*
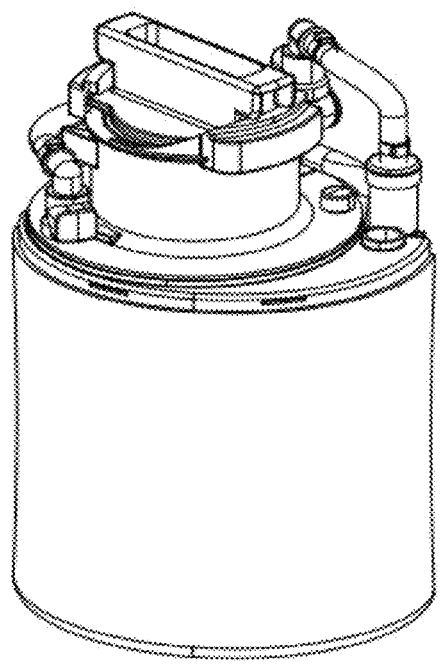
*FIG. 44C*

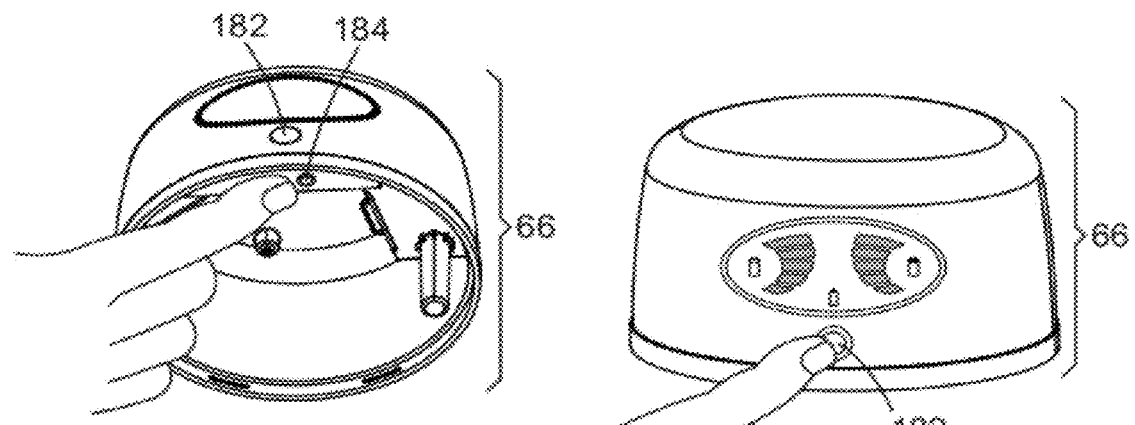
FIG. 45A
FIG. 45B
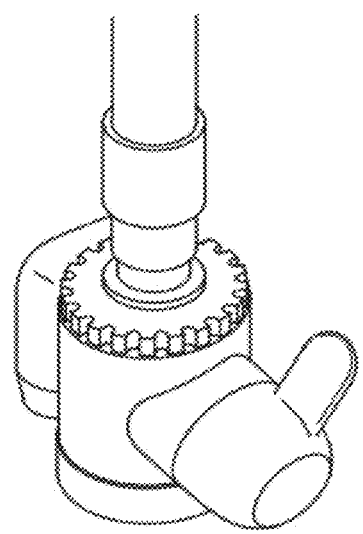
FIG. 46

COUNTER TOP WATER FILTRATION SYSTEM

RELATED APPLICATIONS

This application is a continuation-in-part of U.S. Provisional Application No. 60/614,316, of Basset et al., filed on Sep. 29, 2004, the disclosure of which is herein incorporated by reference to the extent not inconsistent with the present disclosure.

BACKGROUND OF THE INVENTION

The present disclosure relates to a multi component counter top water filtration system having several new and unique features, more specifically to a counter top water filtration system having two filtration media cartridges, one media cartridge being replaceable at least twice before the second media cartridge exceeds its useful life and requires replacement and most specifically to a counter top water filtration system that separates the plumbing and electronic components wherein the lower housing unit houses the plumbing components such as the water filtration pressure vessel, tubing and flow indication signaling device and the upper unit houses the electronics component and filtration methods related thereto.

In the past, various types of filtration systems including apparatus have been used to filter water. Over the years, a number of water filtration systems and devices have been developed to meet the needs of the users who desire to filter their water beyond that provided by various other means including municipal water filtration efforts. It seems that as technology advances to ease man's every day burdens; our society seems to generate more contaminants and additives, which then find their way into our water supplies. Thus, in order to reduce our exposure to the contaminants and impurities now found in our water supply it has become increasingly important to take additional steps beyond municipal water treatment in order to remove contaminates from our water before it is consumed.

In that regard, many end users have expressed increasing concerns regarding the extent of the contamination in their drinking water supplies. To address these concerns, end users have taken a variety of measures to ensure removal of the maximum amount of contamination from their drinking water. In order to accomplish this, some end users now purchase bottled water while others have installed water filtration systems in their homes.

Presently there are numerous types of home water filtration systems that are commercially available. Some of these systems utilize distillation, activated carbon filtration, sediment filters, deionization, ion exchange, reverse osmosis separation, and other types of filtration and separation systems for removing impurities from potable water. The types of systems available to the homeowner range from simple filters with limited capacities that remove impurities to elaborate and expensive systems, which may be complex and cumbersome. Some systems/units attach directly to and hang from the faucet or tap. There are also units, which require complex plumbing attachments prior to connection with the faucet or tap. Additionally, there are countertop units which can be connected to the faucet or tap, but occupy countertop space near the faucet or tap.

Most water filtration systems require a pressure vessel connected to an influent supply of potable water. The water enters the pressure vessel and the impurities in the water are filtered and/or separated out by the water being forced under pressure through a filtering or separating medium. Reject water is then allowed to drain from the system, and the effluent purified water is directed to an outlet for consumer use. Typically, the pressure vessel is contained in an outer housing, which is more aesthetically pleasing in appearance than the pressure vessel. In addition, the usual apparatus has the inlet at one end of the pressure vessel and the outlet at the other end of such vessel. Thus, it is not unusual that significant plumbing considerations are encountered to accommodate the pipes, tubes or hoses needed to connect the filtration system to the homeowner's present plumbing.

It has always been the case that certain types of filters or separation mediums are more efficient at removing certain types of impurities in the water. Thus, although an activated carbon filter may filter out unwanted dissolved organic compounds, it does not eliminate bacterial or viral impurities. Consequently, all single stage filtration systems are limited to filtration that can be effectively accomplished by the single filtering medium within the pressure vessel.

In an attempt to address, the limitations of single stage filtration systems, several multistage filtration systems have been developed which combine at least two filtering mediums into one device or into a series of separate devices to incorporate the advantages of each medium in the filtration process. A major drawback to multistage filtration of water in a system to be available to the homeowner is that such systems can be complex and costly and require elaborate tubing between the water source and filtering mediums. Additionally, the amount or degree of impurities contained in the potable water supplied to a home may vary dramatically from one location to another location. Thus, while one homeowner may have a need for eliminating bacterial contamination, another homeowner may have a need to remove a high degree of contaminant particulate. Consequently, end users in each community may face very different filtration needs. For example, end users in one community may have no need for a system to remove bacterial contamination, and end users in that community certainly would not desire to purchase that capability if it is not needed.

Furthermore, with usage, the filtration system collects the impurities, which are captured within the filters and the like. This impurities collection can dramatically reduce the efficiency of the filtration system. Some of these prior filtration systems do not have replaceable filtration mediums. Thus, instead of just replacing the clogged medium with a new clean medium, a new total filtration system must be purchased.

There are systems that the end cap that is attached to the filter media and is part of the pressure boundary yet has no fluid port because its function is only to close the pressure vessel and not to act as a fluid flow outlet. Fluid communication is through the opposite end of the pressure vessel, as in U.S. Pat. No. 6,325,929 to Bassett.

Although there have been a number of developments in household water filtration systems, it would be an improvement to provide a filtration system in which the filtration mediums can be individually replaced without compromising the integrity of the total filtration system so that a homeowner user may maximize the useful life of each filter medium.

Yet another improvement would be to provide a filtration system in which filtration mediums can be removed in order to replace a clogged or dirty filtration medium with a fresh, new filtration medium thereby enhancing the operating efficiency of the system and maximizing the number of permanent system components.

It would be a further improvement to provide a multistage filtration system, which directs the influent potable water through filtration and separation stages within a single, compact container, which would utilize a minimum of countertop space and eliminate the need for interconnecting tubing between filtration stages.

It has been known in the state of the art for manufactures to balance the various stages of a multi stage filter. As is known in the art, balancing refers to a design process where the performance and life for each filter media of each filter stage is first measured. Then, either the life or the performance of the filter media of each filter stage is matched in an effort to insure that the filter media of each of the filter stages are effectively simultaneously depleted. Previously, it has proven difficult to overcome the problem as to when the life or performance of one media in one stage is significantly longer in life or better in performance than the filter media of one or more of the other filter stages. As will be explained below, the typical particulate filter media stage has a life 6 times that of the typical chemical reduction filter media stage. This substantial difference in filter media life has been the cause of considerable compromises when traditional media balance methods were applied.

As will be described below, the present disclosure provides solutions that combine the greatest life particulate reduction media stage (a life of about 2 years) combined with a cost competitive chemical reduction filter media in a new and innovative manner. If the chemical reduction media were required to have the same life as the particulate reduction filter media, it has been shown that few consumers could afford the resulting filter system nor would they be willing to accept the resulting relatively large filter housing that would be required to house the resulting relatively large amount of filter media.

The innovation of the present disclosure would solve the problem of filtration media balancing by allowing the consumer to change the filtration media that has the shortest life at a different rate than the filtration media having the greater life. As one representative example, one filtration media cartridge contains a carbon block media and another filtration media cartridge contains a pleated membrane media. Depending on the filter performance specifications, the carbon block filtration media cartridge for VOC's, Pb, Hg, Chlorine, TTHM's, and more could be spent in about 4 months, while the pleated membrane filtration media cartridge for Cyst, Asbestos, Turbidity, Sediment, *E Coli, R. terrigena, B diminuta, Psuedonomas Aeruginosa* might have a useful life as long as 2 years. If both filtration media were in a typical single cartridge, disposing of the cartridge at the 4 month point would result in the loss of 20 months of membrane life. By using the cartridge in cartridge innovation of the multi component counter top water filtration system of the present disclosure, the multi component counter top water filtration system of the present disclosure is capable of meeting rigorous performance specifications for the carbon block filtration media cartridge with significantly high efficiency due to the enhanced ability to economically change the carbon block filtration media cartridge frequently. Being able to meet such rigorous performance specifications for the carbon block filtration cartridge in traditional cartridge filtration systems would be more limited with a significant efficiency reduction when compared to the multi component counter top water filtration system of the present disclosure.

The design challenges for a counter top dual filter filtration system wherein the filtration media consist of very different performance characteristics include the encapsulation of both filter media in a single pressure vessel while minimizing the size of the pressure vessel.

One filtration media, the mechanical reduction filtration media, such as, for example, a pleated membrane, is capable of much greater life and typically costs more then the chemical reduction filter media, such as, for example, carbon block. As would be understood by those skilled in the art, in order to produce a chemical filter that matches the mechanical filters life, the chemical filter would have to be extremely large. Such an arrangement, in addition to being inconvenient to the end user, would entail greater cost to produce the carbon block and to encapsulate both filtration media in a single pressure vessel and thus would ultimately increase the cost to end-users.

There have been many attempts to produce dual stage filtration units. However, such attempts have always faced the problem of how to balance the filtration stages within a singular pressure vessel to optimize performance, pressure drop and chemicals/mechanical performance while maintaining control of the size of the unit. In the past, the entire pressure vessel has been replaced when one of the filtration stages became exhausted. However, this practice has proven costly when the other filtration stage has useful remaining life or where relatively small size is a primary consideration.

This basic design problem has previously been solved by others by making all larger pressure vessels or by producing multi stage filtration systems. With most prior multi stage filtration system, mechanical and chemical filters are housed in separate pressure vessels. When either of the filtration media is exhausted, that particular filter cartridge is replaced while leaving the other filtration media in the system.

One representative possible solution to the above problems is to provide a singular pressure vessel, sump enclosure, wherein the center filter media is replaceable while maintaining the second filter media in place. Moreover, with this arrangement, the mechanical filter media is contained in and encapsulated in a pressure vessel with inlet and outlet ports attached to the neck of the closure portion. The closure portion also features an opening to the center or core around the mechanical filter to allow a chemical filter media to be inserted therebetween. This chemical filtration media is operatively connected to the pressure vessel by seals and locking lugs. When utilizing both the mechanical filtration units and a chemical filtration unit, pressure vessel size reduction was achieved by permanently operatively positioning and encapsulating the mechanical filtration media within the pressure vessel and providing for the location of a chemical filtration media to be removably inserted within the opening within the center core of the mechanical filtration media, the chemical filtration media being attached to the pressure vessel by the previously mentioned seals and locking locks. Such arrangements reduce the size of the pressure vessel that would otherwise be required. It has been found that this particular arrangement works well utilizing a mechanical filter media having a life about six times the life of the chemical filtration media.

The innovative pressure vessel has a removable center core cartridge that would allow the changing of the carbon block cartridge at the 4 month point and leave the outer membrane filtration cartridge in place within the pressure vessel. Once the useful life of the carbon block cartridge has been reached, the exhausted carbon block cartridge is removed and a new carbon block cartridge is inserted into the pressure vessel while the membrane portion operatively positioned in the pressure vessel still has useful life remaining. In one representative system, the carbon block component would be changed 6 times more often than the membrane component.

The major benefit to the end user is that they are only changing the filtration media that is exhausted and not the filtration media that still has remaining useful filter life.

SUMMARY OF THE DISCLOSURE

In view of the foregoing needs and problems experienced by end users desiring water filtration systems, it is a primary object of the present disclosure to provide an improved water filtration system that can offer the homeowner the flexibility to filter water according to the homeowner's need by interchangeably introducing various types of filtration mediums into the system or replacing soiled mediums, without compromising the integrity of the system, to accomplish the most efficient water filtration for that homeowner's needs.

It is another object of the present disclosure to provide an apparatus which can be placed on a countertop near the faucet or tap from which the water is taken for treatment, such countertop filtration system having its inlet and outlet connections proximate to one end of the system to reduce the need for significant plumbing.

A further object of the present disclosure is to provide an apparatus which is attractive and compact such that it occupies a minimum of countertop space and offers an outward appearance which is aesthetically pleasing to the homeowner.

Still another object of the present disclosure is to be configured to provide an enclosed storage compartment beneath the pressure vessel for storing the tubes and connections away from the homeowner's view, and wherein such configuration provides a stable base, upon which the pressure vessel can securely rest upon a countertop or any level surface.

Yet another object of the present disclosure to provide multistage filtration of water in a compact, appliance-like container to maximize filtration capabilities while eliminating interconnecting tubing between filtration stages and occupying a minimum amount of space.

The above and other objectives are accomplished in one aspect of the present disclosure which includes A fluid filtration system comprising: an upper housing; electrical components operatively positioned in the upper housing; a lower housing a pressure vessel operatively positioned in the lower housing, the pressure vessel comprising: at least two different filter media components, each being operatively positioned in the lower housing; and plumbing components for operatively connecting the pressure vessel to a fluid supply and at least one filtered fluid delivery structure.

Other objects and advantages of the disclosure will be apparent from the following description, the accompanying drawings and the appended claims.

BRIEF DESCRIPTION OF THE DRAWINGS

FIG. 3 is an exploded perspective view of a representative system monitor of the multi component counter top water filtration system of the present disclosure FIG. 4 is a perspective view of a representative circuit board utilized in the representative system monitor of FIG. 3;

FIG. 5 is a perspective view of a representative system monitor of FIG. 3;

FIG. 18 is a top view of a representative flow control device/magnet of the multi component counter top water filtration system of the present disclosure;

FIG. 19 is a cross sectional view of the flow control/magnet of FIG. 18 taken along line 19-19;

FIG. 20 is a planned view of the representative battery box for use with the multi component counter top water filtration system of the present disclosure;

FIG. 21 is a perspective view of the battery box the FIG. 20;

FIGS. 44A-F illustrates a representative procedure for replacing the replacement pressure vessel consisting of both the pleated membrane filtration media cartridge and the carbon block filtration media cartridges in the lower housing after removal thereof;

FIGS. 45A in the illustrate the procedure for resetting the interactive display to ensure the correct countdown for the next sequence for the multi component counter top water filtration system of the present disclosure; and FIG. 46 illustrates the flushing of the replacement carbon block filtration media cartridge and the replacement pleated membrane filtration media cartridge in order to remove any carbon residue and trapped air bubbles in the system with the diverter valve being set to the filtered water position of the multi component counter top water filtration system of the present disclosure.

DETAILED DESCRIPTION OF REPRESENTATIVE EMBODIMENTS

The present disclosure relates to a multi component counter top water filtration system having several new and unique features, including but not limited to, a counter top water filtration system 50 having two filtration media, one media being replaceable at least twice before the second media exceeds its useful life and requires replacement, presently preferably, both filtration media being housed in a single pressure vessel and, including but not limited to, a counter top water filtration system wherein the plumbing and electronic components are separated such that the lower housing component houses the plumbing components, including but not limited to, the water filtration pressure vessel, tubing and flow indication signaling device and the upper housing component houses the electronics components, including but not limited to, the monitor 180, batteries and the flow indication receiving device and filtration methods related thereto.

The Counter Top System

Figure 1:
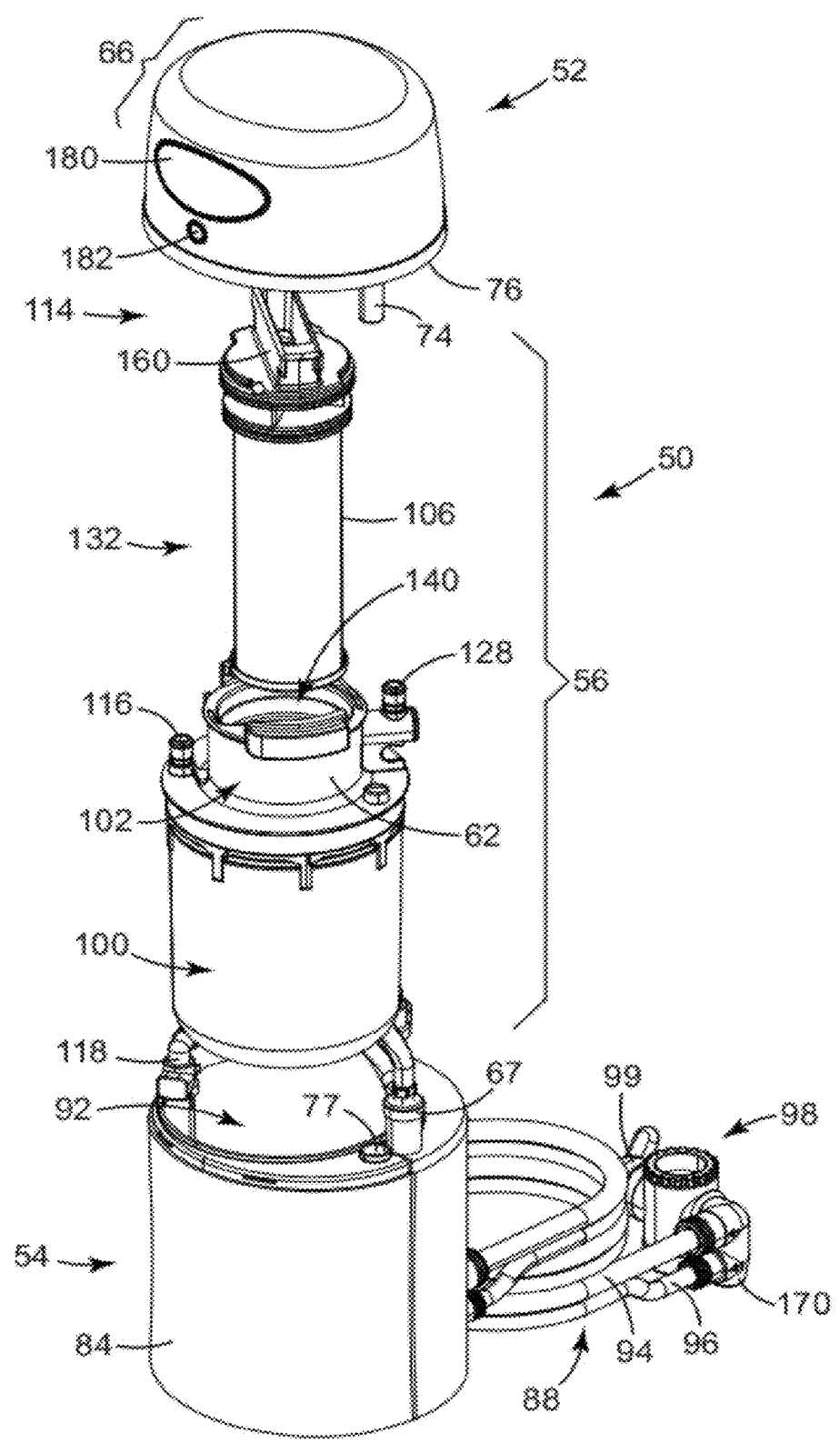
FIG. 1 is an exploded representative perspective view of the multi component counter top water filtration system of the present disclosure.

As illustrated in FIG. 1, the system 50 of the present disclosure includes four major components, those being an upper housing 52, for housing the electrical components, a lower housing 54, for housing a pressure vessel 56, the pressure vessel 56 being operatively positioned in the lower housing 54 and comprising at least two different filter media cartridges and plumbing components for connecting the pressure vessel 56 to the end users water supply. Each of these major components will now be described in detail.

Figure 2:
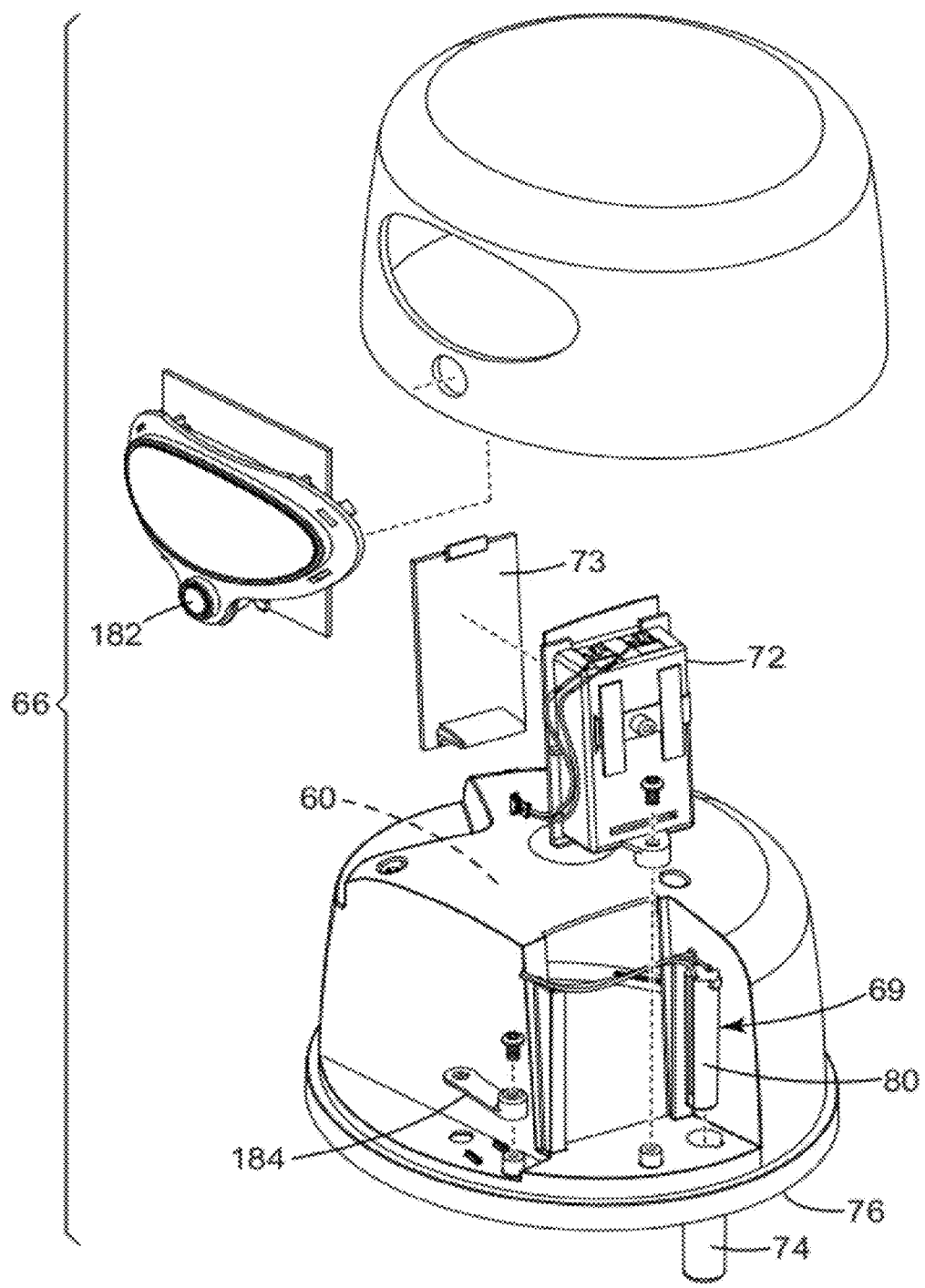
FIG. 2 is an exploded perspective view of a representative upper housing of the multi component counter top water filtration of the present disclosure.

As illustrated in FIGS. 1-2, the upper housing component 52 comprises an open area 60 for encasing the upper portion 62 of the pressure vessel 56 and for operatively cooperating with the lower housing component 54. As illustrated, the electronic components 66 of the system 50 are operatively positioned therein including the circuit board and other conventional components. As illustrated in FIGS. 3-5, the circuit board 70 and battery compartment 72 for housing the batteries that power the electrical system are operatively positioned internal of the upper housing 52. Adjacent to the battery compartment 72 is a protrusion 74 that extends from and beyond the lower surface 76 of the upper housing component 52 which is adapted for mating with a corresponding first aperture 77 operatively formed in the lower housing component 54. A reed switch 80 is operatively positioned in protrusion 74 of the upper housing component 52 with a magnet 82 being operatively positioned in the lower housing 54 for cooperation therewith.

Figure 6:
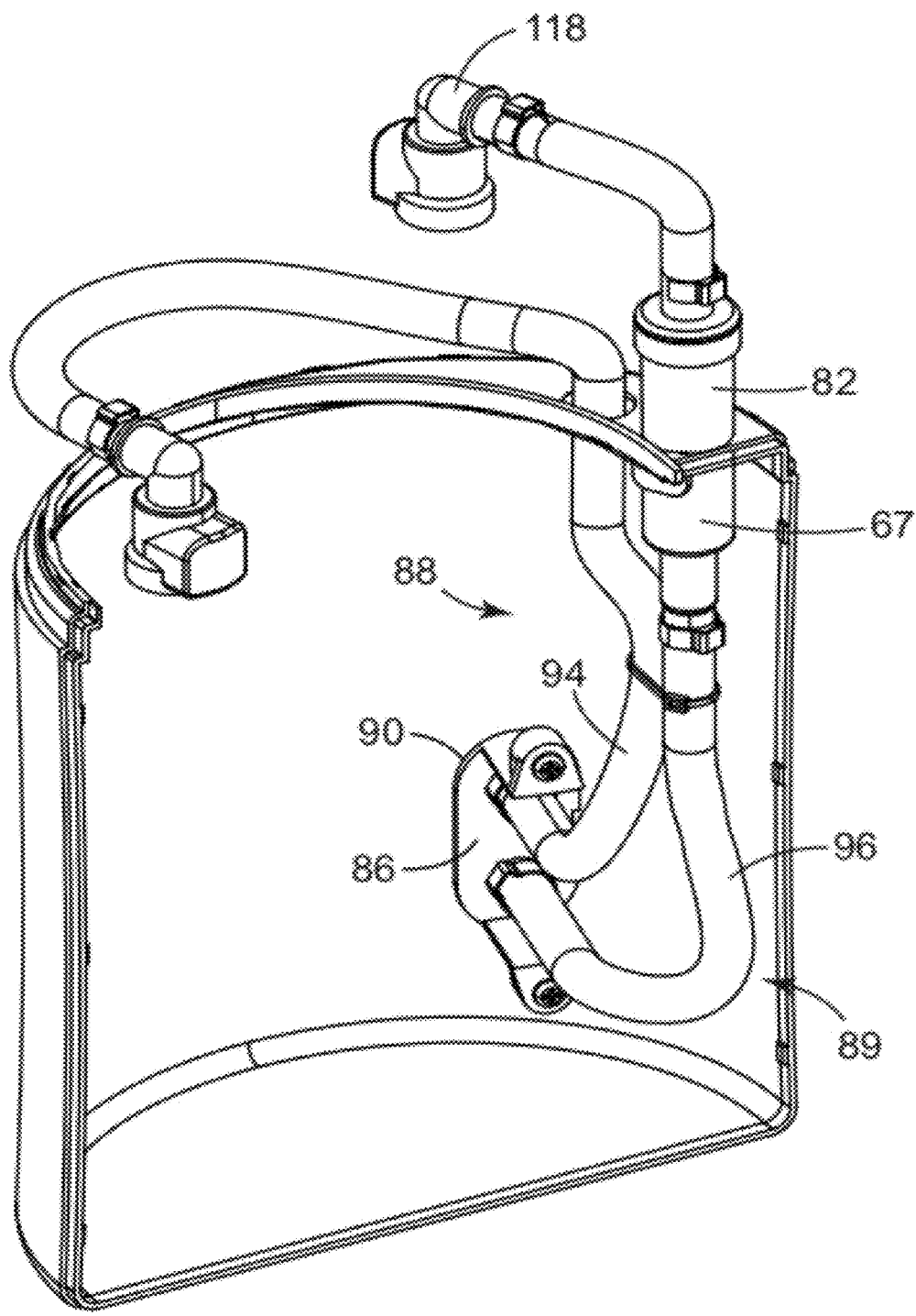
FIG. 6 is a perspective view of the a representative section of the lower housing of the multi component counter top water filtration system of the present disclosure.

The lower housing component 54 comprises a generally hollow container 84 presently preferably made of plastic, and including structure 86 for accommodating plumbing 88 such as, for example tubing 89, for interfacing with the pressure vessel 56 that contains the filter cartridges. As illustrated in FIG. 6, the lower housing component 54 includes a second aperture 90 formed in the side thereof for routing the plumbing tubing 89 into the interior 92 of the lower housing component 54.

Figure 7:
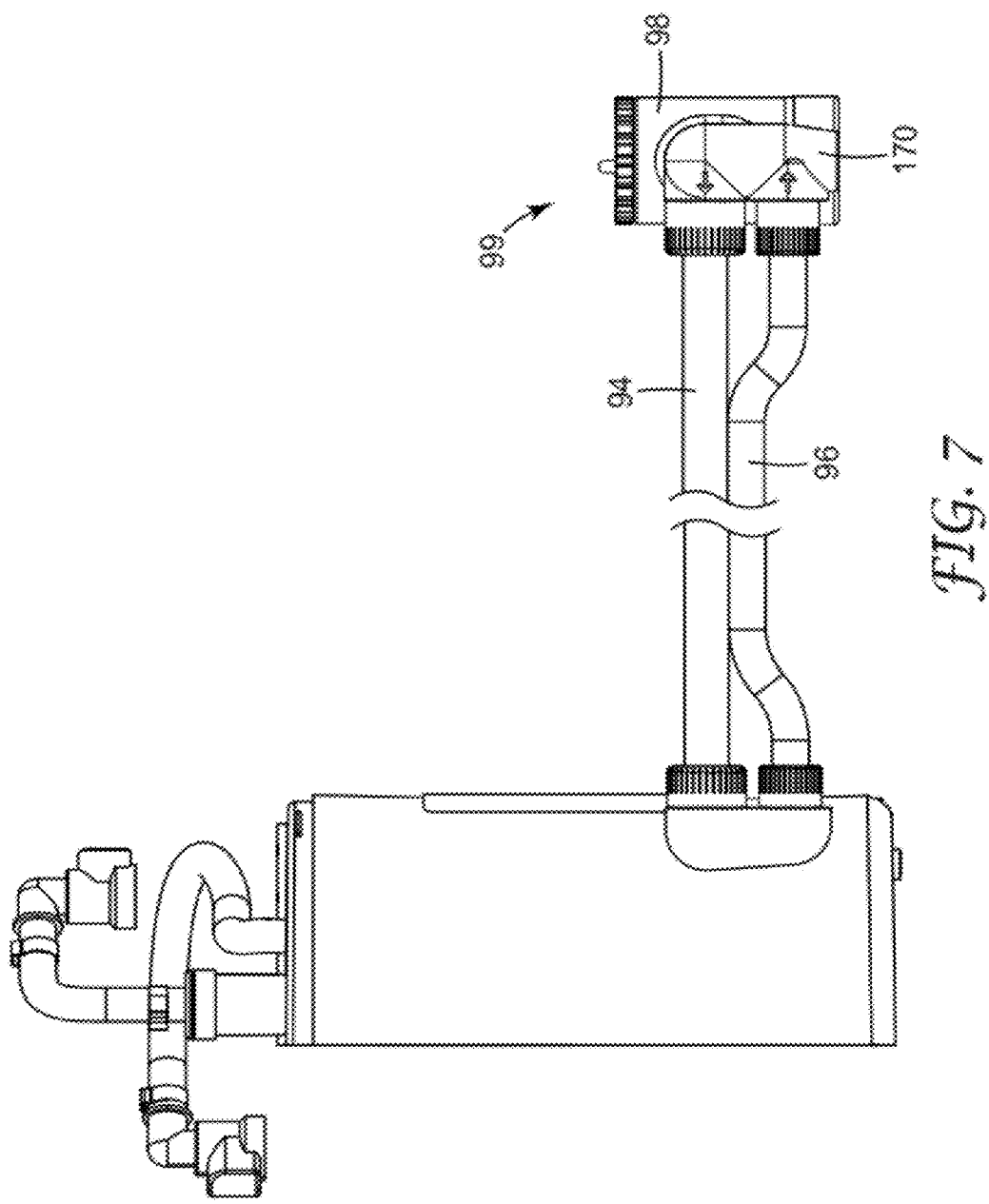
FIG. 7 is a perspective view of the representative section of the lower housing of FIG. 6 viewed from a different perspective including a representative diverter valve and associated tubing.
Figure 8:
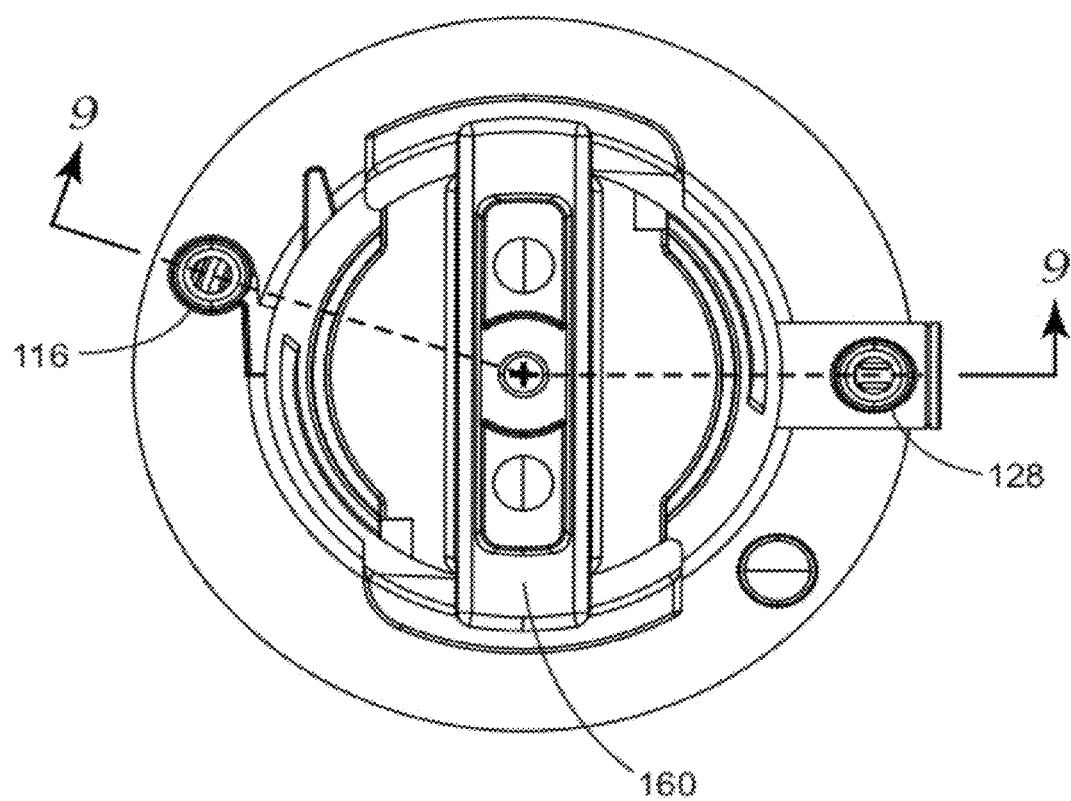
FIG. 8 is a top view of a representative pressure vessel of the multi component counter top water filtration system of the present disclosure.

Inlet 94 and outlet 96 tubing, for operatively connecting the end users water supply (not shown) to the pressure vessel 56, is illustrated in FIGS. 1 and 7. Structure 99 for operatively connecting to the end users water supply is operatively positioned at one end of both the inlet 94 and the outlet 96 tubing. The structure 99 includes a conventional selectable position diverter valve 98 for selectively routing water from the water supply to the pressure vessel 56 and back to the selectable positioned diverter valve 98.

As illustrated in FIGS. 1 and 8-13, the pressure vessel 56 of the present disclosure comprises a lower pressure element 100, presently preferably made of injected molded plastic, and an upper pressure element 102, also presently preferably, made of injected molded plastic. The lower and the upper injected molded pressure elements 100, 102 are operatively connected when finally assembled, presently preferably, by spin welding or other equivalent method.

The lower pressure element 100 comprises an outer hollow area 104 for encasing a first filter media cartridge (membrane) 106 and a second hollow area 108 interior of the outer hollow area 104 for removably receiving a second filter media cartridge 110 (carbon block). As illustrated, the open end 112 of the upper pressure element 102 of the pressure vessel 56 comprises structure 114 for operatively removably positioning the second filter media cartridge 110 interior of the first filter media cartridge 106.

The inlet 94 plumbing tubing is operatively connected to the pressure vessel 56 via an inlet port 116 operatively positioned in the upper pressure element 102 of the pressure vessel 56. As illustrated in FIGS. 1, 8-13, a conventional connector 118 is operatively connected to an inlet port 116 such that the water is routed into a space 120 formed between the inner wall 122 of the lower pressure element 100 of the pressure vessel 56 and the first filter media. As illustrated, an outlet port 128 for transferring filtered water from the pressure vessel 56 back to the selectable position diverter valve 98 is operatively positioned so that the filtered water exits the pressure vessel 56 via the upper end 130 of a center core assembly 132 operatively removably positioned in the upper pressure element 102, as will be explained in more detail below, and then through the outlet 96 plumbing tubing operatively connected to the outlet port 128 in the neck 131 of the upper pressure element 102 of the pressure vessel 56. Additionally, a pressure relief value 133 is operatively positioned on the upper surface 134 of the upper pressure element 102 of the pressure vessel 56 for allowing any air that may become trapped on the backside of the first or outer filter cartridge 106 to be bleed out of the system so that water can efficiently flow through the outer filter cartridge 106. As is known to those skilled in the art, when air becomes trapped, there is not sufficient pressure to overcome the bubble point and allow the water to displace the air through the filter medium so that the water can flow through the filter medium.

Now that we have described the overall system generally, a more detailed description of the overall system 50 and each sub component follow.

The System's Filtration Cartridge Construction and Filtration Media Performance Balancing Scheme One unique feature of the present disclosure relates to the filtration cartridge construction and the filtration media performance balancing scheme. As is known, cartridges typically house a singular media type such as, for example, sediment, carbon block or membrane. Known prior combination filters that house several media types, such as, for example, a split prefilter have typically consisted of a carbon media and a sediment filter in a singular component housing. In these type combination filters, when a combination filter cartridge was replaced, all media types were changed at the same time. Each filter cartridge was considered depleted based on the filtration media that was exhausted first. As would be understood by those skilled in the art, there was usually still some useful life remaining in one of the media that was disposed of when the cartridge was changed.

In order to maximize filter performance in known combination filters, the different filtration media utilized therein must be balanced to insure that the end user does not dispose of the filtration media having an unacceptable amount of useful filtration life remaining or excessive having filtration life that has not yet been exhausted. Some filtration media have a much greater potential useful life than other filtration media. As mention above, the useful filtration life disparity between various filtration media causes a balance problem when the size of one or more of the filtration media is a limiting factor. For example, if the useful filtration life disparity between to filter media is 6×, than the choice becomes whether to increase the size of the lower useful life filtration media by 6 times, thereby resulting in a significantly larger housing or, to decrease the size of the greater useful life filtration media by ⅙th. As is known in the art, there are numerous situations where either alternative is either impossible or unacceptable.

The present disclosure provides an acceptable solution to the filtration media balancing problem by allowing the end user to change the filtration media that has the shortest useful life at a different rate than the filtration media having the greater useful life. One specific representative example includes, but is not limited to, a pressure vessel 56 comprising a carbon block filtration media cartridge 110 and a pleated membrane filtration media cartridge 106. Depending on the filtration media performance, the carbon block filtration media 110 cartridge could exceed its useful life in about 4 months, while the pleated membrane filtration media cartridge might not exceed its useful life for as long as 2 years, a 6× disparity. If both filtration media were in a typical single pressure vessel 56, disposing of the single pressure vessel 56 containing the two different filtration media at about the 4 month point would result in the loss of about 20 months of useful membrane life.

In an effort to address this problem, the pressure vessel 56 of the present disclosure includes a removable center core assembly 132 assembly including the carbon block filtration media cartridge 110 that would provide for the changing of the carbon block filtration media cartridge 110 mentioned above at about the 4 month point and leaves the pleated membrane filtration media cartridge in place in the pressure vessel 56. At this point, a new removable center core assembly 132 assembly including the carbon block filtration media cartridge 110 would be operatively inserted into the pressure vessel 56 while the membrane filtration media cartridge still has useful life. In this representative example, the carbon block filtration media cartridge 110 component would be changed about 6 times more often than the membrane filtration media cartridge component. An additional feature of the preferred center core assembly 132 including the carbon block filtration media cartridge 110 is that, as presently constructed, the end user does not have to disconnect any plumbing 88 or electronic components 66 in order to change out the carbon block component filtration media cartridge 110 component, as will be discussed in more detail below.

As should be readily apparent, the representative pressure vessel 56 structure described above provides a major benefit to the end user in that the end user is only changing the filtration media cartridge that has exhausted its useful life and not the filtration media cartridge that still has useful life.

Center Core Assembly Upper End Cap

As illustrated in FIGS. 14-17, another representative and unique feature of the present disclosure is the structural design of the center core assembly 132 end cap 140 which includes an upper plate 142 and a lower plate 144, the lower plate 144 includes a flow path 146 for the fluid communication outside of the pressure vessel 56 without the need for a separate fluid port being position in the end cap 140.

One especially useful benefit of this particular design is that the changing of the center core assembly 132 filtration media cartridge is accomplished without disconnecting any of the multi component counter top water filtration systems plumbing 88 fittings. As should be apparent, when an end user changes the center core assembly 132 filtration media cartridge at a frequency greater than the outer pressure vessel 56 filtration media cartridge, a previously unattained convenience of being able to change that center core assembly 132 filter, simply and without disconnecting any plumbing connections is highly desirable and is achieved by the multi component counter top water filtration system 50 of the present disclosure.

In the prior Cuno U.S. Pat. No. 6,325,929 to Bassett, an end cap is attached to the filter media and is part of the pressure boundary. This end cap has no fluid port because its sole function is to close the pressure vessel 56. Thus, fluid communication outside the pressure vessel 56 is achieved through the opposite end or other locations of the pressure vessel 56.

In the case of the new counter top water filtration system 50 of the present disclosure, the center core assembly 132 filter or filtration media cartridge is replaced through the top or fluid connection end of the pressure vessel 56. As it would be rather inconvenient to disconnect any of the plumbing 88 fittings when the end user needed to replace the center core assembly 132 filter or filtration media cartridge, the new and innovative end cap 140 of the present disclosure fluidly communicates outside the pressure vessel 56 via a port 128 operatively positioned on the neck 131 of the pressure vessel 56 which is then operatively connected to the outlet 96 fitting and tubing.

Because the outlet of a filter media cartridge is typically in the center, and in this case, the outlet is on the neck 131 or side of the pressure vessel 56, a new and innovative center core assembly 132 lower end cap plate 144 was developed to specifically address this situation. As shown in FIG. 14-17, the lower plate 144 of the center core assembly 132 upper end cap 140 is operatively connected to the filter media cartridge and serves as the media cartridge end cap. The lower plate 144 is sealed to the inside of the neck 131 by an O-Ring seal. In addition, the lower plate includes at least one aperture 146 operatively positioned, presently preferably, in the center thereof in order to allow the filtered water to pass through the lower plate 144 and out of the multi component counter top water filtration system 50 of the present disclosure via the outlet 128 operatively positioned in fluid communication therewith.

As shown in FIGS. 1 and 14-17, the upper plate 142 of the center core assembly 132 upper end cap 140 is located parallel to and above the lower plate 144. As shown, the upper plate 142 is also sealed to the inside of the neck 131 by an O-Ring seal. The upper plate 142 is solid with no fluid passageways therein and thus, becomes the closure element of the pressure vessel 56. The two plates, upper 142 and lower 144, are held together by support ribs 148 such that a substantially rigid component results.

As illustrated, the outlet port 128 and the plumbing 88 fitting related thereto is operatively positioned between the upper 142 and lower 144 plates on the neck 131 of the pressure vessel 56. The filtered fluid from the center core assembly 132 filtration media cartridge passes through the fluid passage means or at least one aperture 146 formed in the lower plate 144 into an area 150 formed between the upper 142 and lower 144 plates. From the area 150 between the two plates, the filtered fluid is allowed to pass though the outlet port 128 to the outlet pluming 88 operatively positioned between the outlet port and the end user selectable valve 98 at the point of use.

This new and innovative center core assembly 132 upper end cap 140 configuration of the present disclosure that includes the upper and lower plates as described above, facilitates the removal and replacement of the center core assembly 132 filtration media cartridge by an end user without having to disconnect the fluid outlet fitting. Another benefit of the new and innovative end cap 140 configuration of the present disclosure is the reliability improvement and cost reduction resulting from the reduction in the number of parts that constitute the center core assembly 132 upper end cap 140. Having an end cap 140 whose function is to insure that fluid passes through the filter media, to also be the pressure vessel 56 closure, and be the method to communicating with the outlet plumbing 88 saves both part count and labor versus assembling various possible different configurations.

Handle for Providing Mechanical Advantage in Order to Reduce the Breakout Force Required to Replace the Filter Media Another new, unique and innovative feature of the present disclosure comprises a handle 160 configuration that is configured such that the O-Ring seals are disengaged without rotation in order to the reduce breakout force required to remove and replace the center core assembly 132 filter media cartridge.

In order to meet certain filter performance specifications related to the amount of contaminants removed, one representative embodiment of the center core assembly 132 filtration media cartridge required an about 2.25 inch outside diameter. Such a sized outside diameter means that the opening 112 in the top of the pressure vessel 56 needed to be some what larger in diameter. It is known that as the diameter of an O-Ring sealing area increases so does the force required to dislodge the O-Ring seal from their closed operating position. As is also known, the longer the O-Ring seal remains in the closed operative position, the force required to break the seal out from the closed operating position increases. Thus, there is a finite limit to the sealing diameter where it is no longer possible to overcome the breakout force by hand and additional force, such as, for example, a wrench is required in order to provide sufficient force to break the O-Ring seal.

In order to reduce the torque required to be transmitted to the center core assembly 132 filtration media cartridge to overcome the breakout force in order to remove the center core assembly 132 filtration media cartridge, a swiveling handle 160 configuration was developed. In the case where the filtration media cartridge is removed from fluid connection by a quarter turn method, the O-Ring seal is rotationally turned as it is translated out of the O-Ring sealing area. As the filtration media cartridge is removed from the operating position, there are at least two force components to overcome, the rotationally turning force or rotation component (most difficult to overcome) and the translating force component (less difficult to overcome). Further, each of these components has breakout forces that must also be overcome. Together these two force components have traditionally proven to be very difficult to overcome especially if the sealing area/diameter is large, and the O-Ring has been operatively engaged in the operating position for a long time. By assembling the sealing end cap 140 and the removing handle 160 as two components and operatively connecting them with a swiveling joint 162, the two force components required to remove the center core assembly 132 filtration media cartridge is effectively reduced to the translation force component and its breakout force component only. Additionally, the swivel joint 162 provides a mechanical advantage.

In this case, the rotational force component is effectively significantly reduced from a theoretical value of 250 to a working value of 25 about 20 in*lbs. by use of the swivel joint 162. By providing for the handle 160 to swivel with respect to the end cap 140, the handle 160 swivels to engage the filter media cartridge removal ramps 137 while the end cap 140 remains in place in the operating position, as the handle 160 continues to rotate and starts to translate due to the removal ramps 137. Since the handle 160 is attached to the end cap 140 and thus the end cap 140 follows the handle 160 in the translation. Since the ramp profile is not angular but instead has a cam profile where the beginning of the cam is very shallow in order to apply the greatest mechanical advantage such that the breakout force is overcome. Since the required force is reduced as soon as the O-Ring begins to move, the cam ramps become steeper toward the end thereof. The converse is also true, as when the end user inserts a new center core assembly 132 filter into the operating position, the end cap 140 does not rotate during installation, reducing the effort required to accomplish installation.

Separation of the Electronic Components from the Plumbing Components

Another new and innovative feature of the present counter top water filtration system 50 is the effective separation of the electronic components 66 and the plumbing 88.

It has been observed during the development and deployment of other prior counter top water filtration devices that housing the electronic components 66 in the same location as the pressure vessel 56 can cause condensation to accumulate on the printed circuit board 70 (PCB) and short out the electrical components 66. For this and other reasons, the counter top water filtration system 50 of the present disclosure houses the electronic components 66 in the upper housing 52 and the plumbing 88 components in the lower housing 54. In this way, the electronic components 66 are isolated from possible condensation and other environmental factors that might cause the electronic components 66 to malfunction, such as, for example, short out. In order to accomplish this goal, the flow sensing sending component 67 and the flow sensing receiving component 69 housed in protrusion 74, have been designed to be housed in separate housings components of the system 50.

Typically when designing a prior counter top system, the flow switch had been a singular component. As is known, two components comprise a typical conventional singular component flow switch. One component comprises a flow sensing sending component 67 and a magnet 82 that typically resides in a flow chamber 81. When flow occurs, the magnet 82 displaces in the direction of the flow. This displacement puts the magnet's magnetic field in proximity to a flow sensing receiving component 67 and reed switch 80. The reed switch 80 senses the magnetic field and closes to complete an electronic circuit. Because the typical magnets used in flow switches are relatively weak, the reed switch 80 needs to be located in very close proximity to the magnet 82. The need to be so proximity located is the primary reason flow switches have conventionally been sold as a singular component.

The counter top water filtration system 50 of the present disclosure operatively positions the magnet 82 in a flow chamber 81 operatively connected to the lower housing 54 with the reed switch 80 being operatively connected to the upper housing 52. However, such location of the two components presented several problems that needed to be overcome in order to provide a robust counter top water filtration system 50. The first problem encountered during the development of the counter top water filtration system 50 of the present disclosure was that initially it was determined that the magnet 82 and the reed switch 80 needed to separated by about 3 times the normal distance. This increased separation distance required a relatively stronger magnet 82 and the development of a new method for insuring that when the two components of the flow switch effectively operatively interact together, the two components are always positioned safely within the flow switch activation zone.

Without the above described flow switch 80 configuration, when the end user needed to replace the core assembly 132 fluid filtering media cartridge, the end user would be required to either disconnect the plumbing 88 or disconnect the electronic connectors. In the presently preferred embodiment of the present disclosure, the end user simply disassembles the upper housing 52 from the lower housing 54 without disconnecting either the plumbing 88 or the electronic connections. Removing the upper housing 52 exposes the plumbing 88 and fluid filtering media cartridges or pressure vessel 56 housed in the lower housing 54. This new and innovative configuration is a great convenience to the end user, as they do not need to remember to disconnect something or have to remember to reconnect something. Thus, the above described configuration that requires the separation of the two flow switch components is believed new and unique with respect to prior flow switch technology.

Placing the System in Operation

Now that we have described the various components of the multi component counter top water filtration system 50 of the present disclosure, we will describe how an end user would place the system 50 in operation in the environment of use. First, the end user would separate the upper housing 52 from the lower housing 54 of the multi component counter top water filtration system 50, turn the upper housing 52 over and locate the battery compartment 72 (see FIGS. 2 and 20-21) inside the multi component counter top water filtration system 50 upper housing 52 and remove the battery compartment cover 73. Install 2 AA batteries in the battery compartment 72 insuring that the orientation of the (+) and (−) terminals for each battery is correctly installed.

Figure 22:
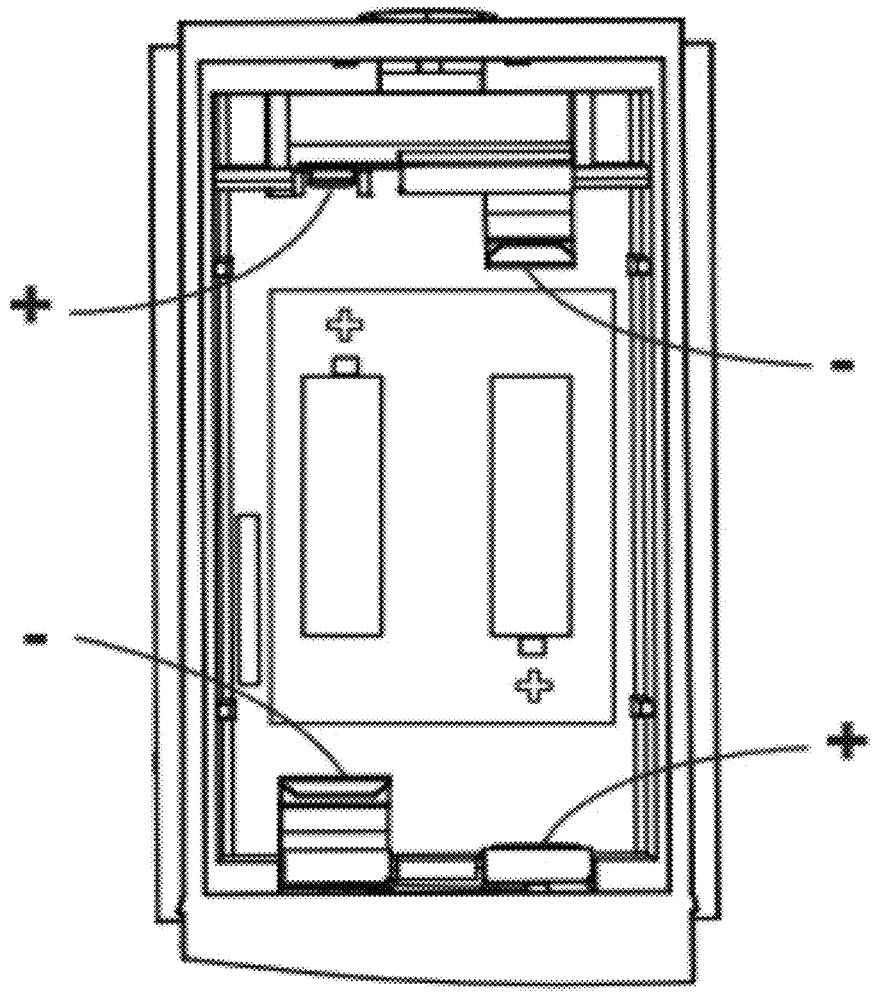
FIG. 22 is a partial perspective view of the battery compartment and the circuit board housing positioned inside the representative upper housing of the multi component counter top water filtration system of the present disclosure.
Figure 23:
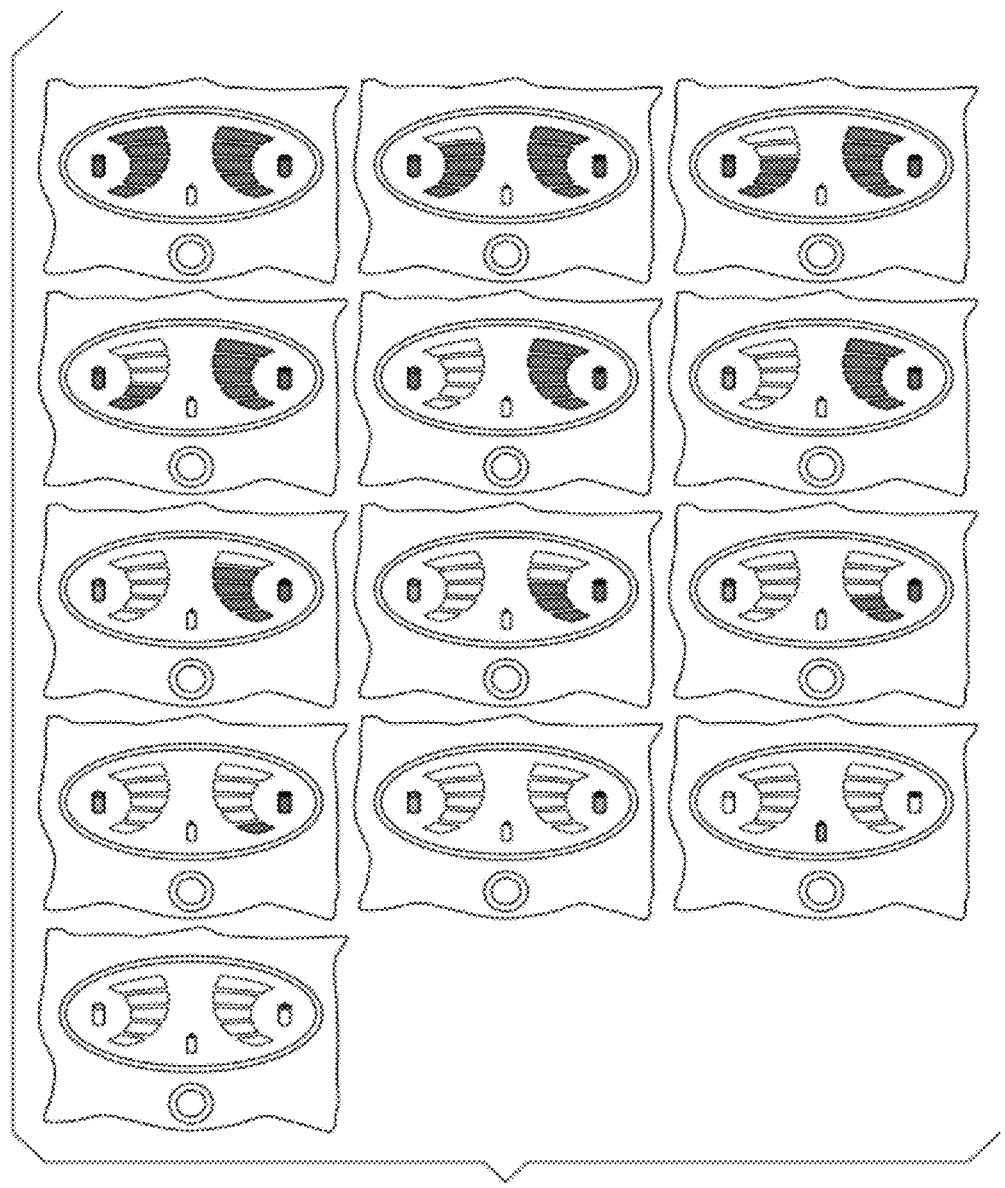
FIG. 23 is a representation of the various stages displayed by the representative system monitor of the multi component counter top water filtration system of the present disclosure.

Replace the cover 73 of the battery compartment 72 once the batteries are installed. To test the battery connections and to ensure that the system monitor 180 is functioning, push the button 182 on the front of the upper housing 52 and hold it in for about 6 seconds. The system monitor 180 should cycle through its functions with all lights activated in sequence. If the system monitor 180 does not work, the the batteries should be checked (see FIGS. 20 and 22; note that sequence represented by FIG. 23 will occur each time before the next bar will disappear from the filter symbol 2 display.)

Remove the pleated membrane filtration media cartridge, (the larger of the two cartridges) from the box. Remove the carbon filter cartridge 110 from the box and insert the carbon filter cartridge into the center portion of the pleated membrane filtration media cartridge 106. As best illustrated in FIGS. 23A and B, insert the carbon filter cartridge all the way down into the pleated membrane filtration media cartridge and rotate the carbon block filtration media cartridge handle 160 all the way to the right until rotations stops.

Figure 24A:
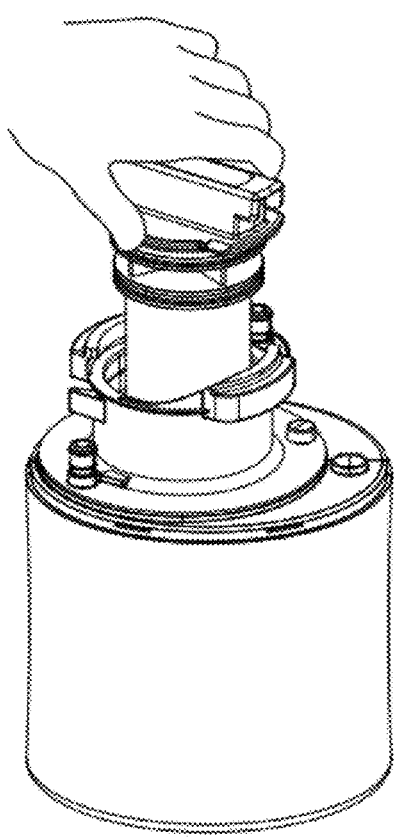
FIGS. 24A and 24B illustrate the insertion of the carbon filter cartridge into the pleated membrane filtration media cartridge of the multi component counter top water filtration system of the present disclosure.
Figure 24B:
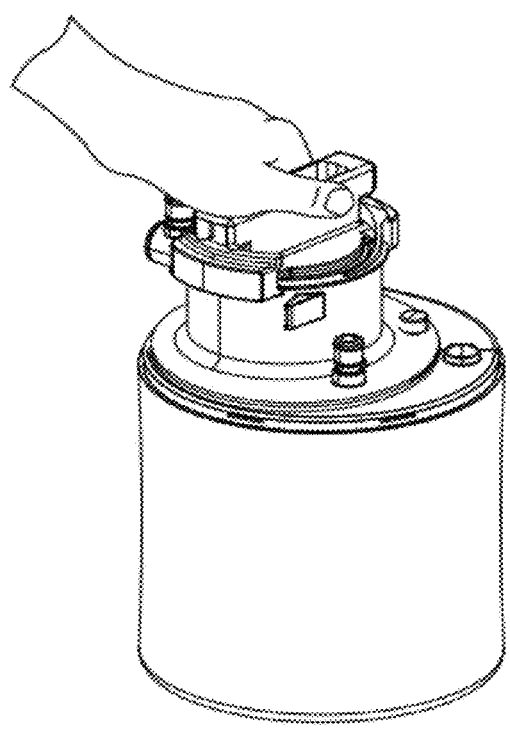

As best illustrated in FIG. 24A-C, first, insure that the hoses in the lower housing 54 are clear; second, align the two vertical ribs on the lower housing 54 t with the cut out in the opening of the lower housing 54 in order to allow the pressure vessel 56 to fit completely into the lower housing 54 of the multi component counter top water filtration system 50; and then insert the assembled two filter assembly, which constitutes the system pressure vessel 56, into the lower housing 54 of the multi component counter top water filtration system 50.

Figures 25A, 25B:
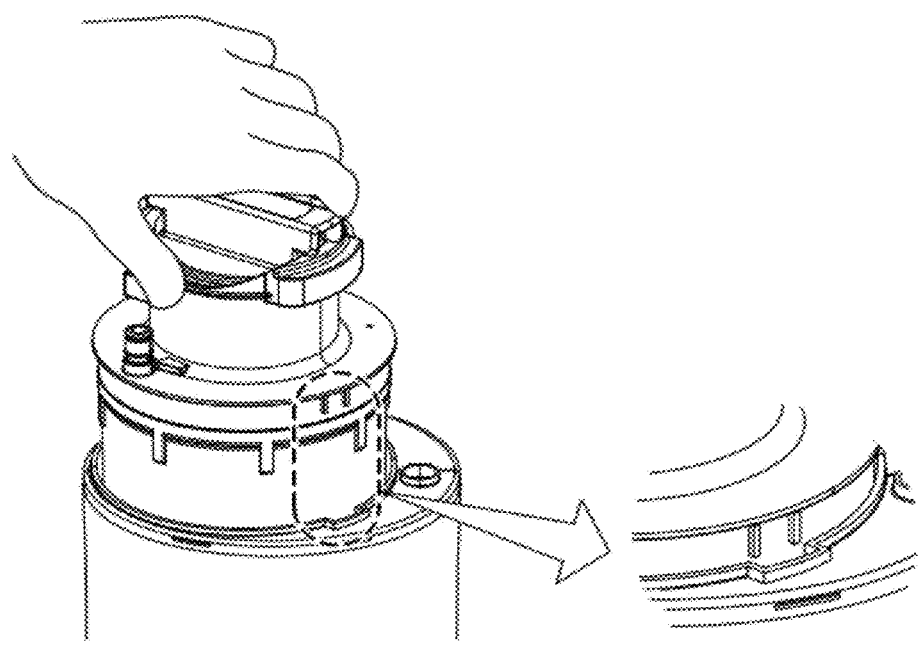
FIGS. 25A-C illustrates the assembly of the representative pressure vessel into the lower housing of the multi component counter top water filtration system of the present disclosure.
Figure 25C:
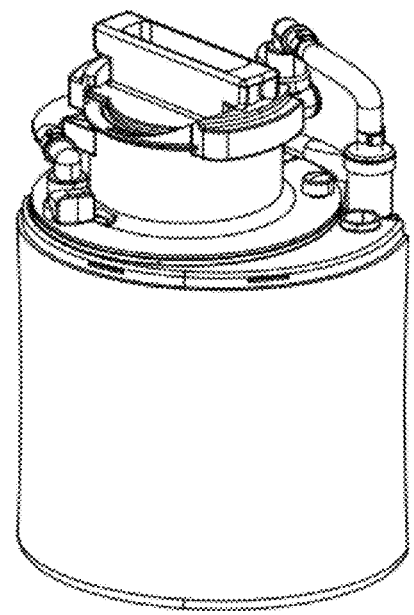
Figure 26A:
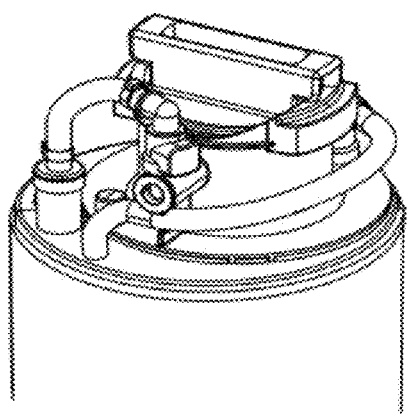
FIGS. 26A and 26B illustrate connection of the hose snap on assemblies to the inlet of the representative pressure vessel of the multi component counter top water filtration system of the present disclosure.
Figure 26B:
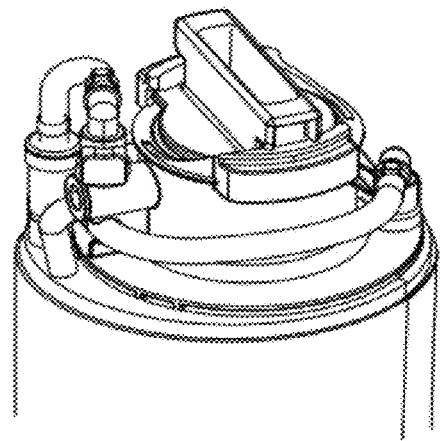
Figure 27:
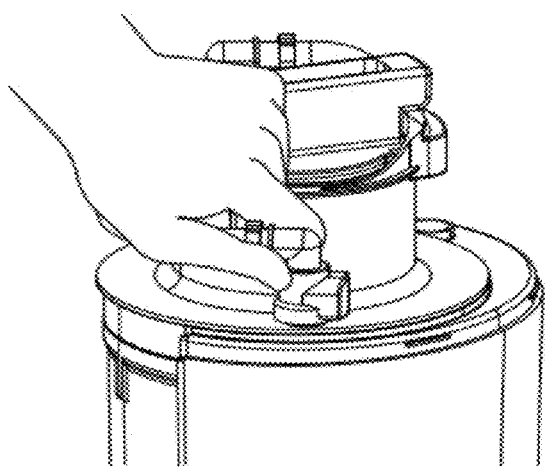
FIG. 27 illustrates the connection of the outlet of the representative pressure vessel of the multi component counter top water filtration system of the present disclosure.

Next, as best illustrated in FIGS. 25A and B, and 30, take the longer of the two hoses and guide it around the side of the assembled pressure vessel 56 and snap the end connector over the inlet 116 fitting on the other side of the assembled pressure vessel 56. Then, push the hose into the circular cut-out in the base of the remaining fitting. Snap the shorter hose onto the remaining outlet 128 fitting.

Do not re-install the upper housing 52 at this time. The upper housing 52 will be installed after the multi component counter top water filtration system 50 has been completely connected to the water supply structure, such as, for example, the faucet.

Figure 28:
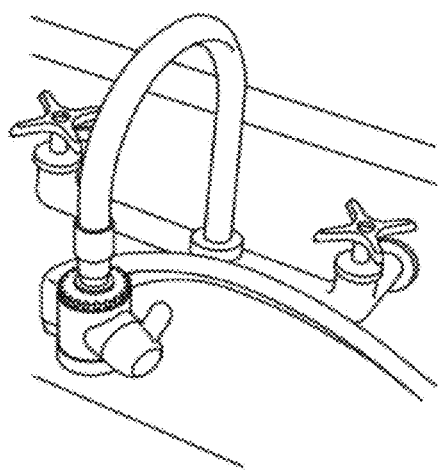
FIG. 28 illustrates a representative operable connection between the water source and a representative diverter valve of the multi component counter top water filtration system of the present disclosure.

As best illustrated in FIG. 28, connection to the water supply structure is accomplished by use of a diverter valve 98 at the end of the hoses. The diverter valve 98 is then connected to the faucet chosen to supply cold water to the multi component counter top water filtration system 50. The configuration of the end of the faucet should be matched to the appropriate adaptor (not shown) provided with the multi component counter top water filtration system 50. Install the correct adaptor and connect the diverter valve 98 securely to the end of the faucet. Then, test the diverter valve 98 connection for leaks. At this point caution should be exercised to ensure that hot water is never used in the multi component counter top water filtration system 50, as hot water will reduce the carbon filter's efficiency, among other potential adverse results thereof.

Figure 29A:
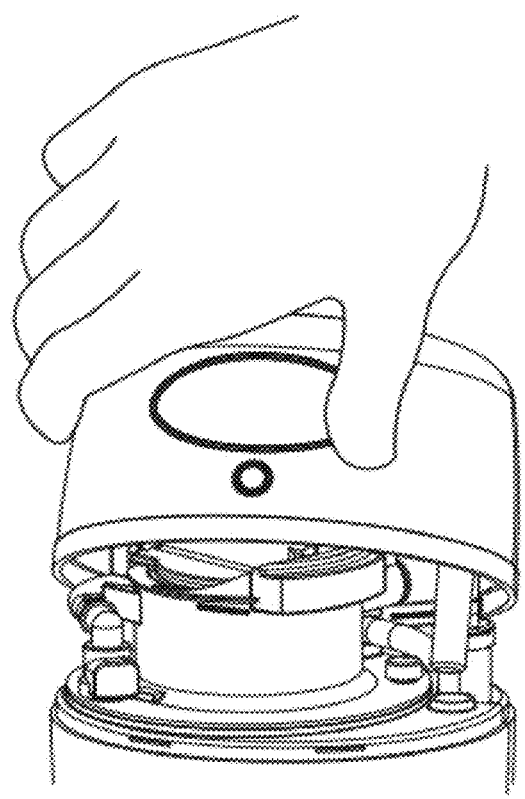
FIGS. 29A and 29B illustrates the installation of the representative upper housing to the representative lower housing of the multi component counter top water filtration system of the present disclosure.
Figure 29B:
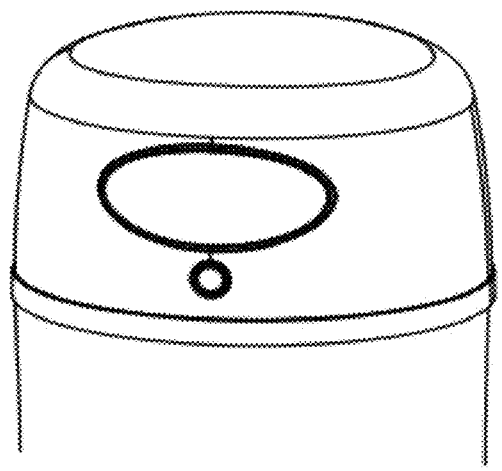

Very slowly turn the cold water faucet on. Look for any water leaks at the diverter valve 98 and in the lower housing 54 of the multi component counter top water filtration system 50 where the hoses snap onto the fittings. If the diverter valve 98 or lower housing 54 fittings are leaking, reassemble the connections. If no leaks are observed, as best illustrated in FIGS. 29A and B, install the upper housing 52 onto the lower housing 54 of the multi component counter top water filtration system 50 making sure that the upper housing 52 snaps into place.

Before using the multi component counter top water filtration system 50 for the first time and after every carbon filter replacement, the user must flush water through the carbon filter cartridge 10 in order to remove any carbon residue and trapped air bubbles. While conducting the flush, be sure that the diverter valve 98 is set to the filtered water position.

Figure 30:
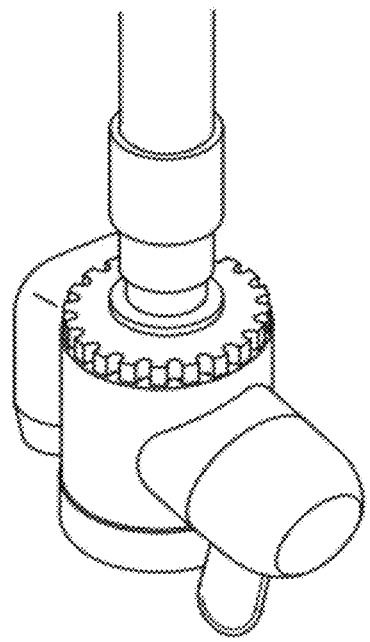
FIG. 30 illustrates a representative first setting of the diverter valve of the multi component counter top water filtration system of the present disclosure used for obtaining unfiltered spray hot and cold water.
Figure 31:
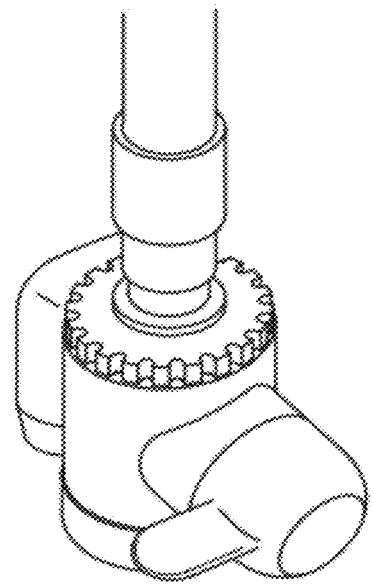
FIG. 31 illustrates a representative a second setting of the diverter valve of the multi component counter top water filtration system of the present disclosure used for obtaining unfiltered stream hot and cold water.
Figure 32:
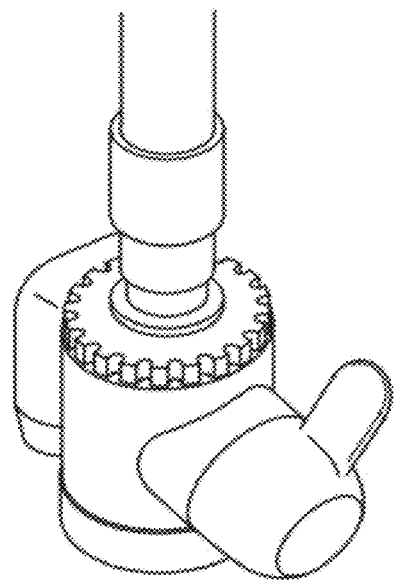
FIG. 32 illustrates a representative a third setting of the diverter valve of the multi component counter top water filtration system of the present disclosure used for obtaining filtered and cold water only.

The diverter valve 98 has three settings that control the flow of water from the water source that a user may require. A user can access each setting by turning the control handle 101 on the right side of the diverter valve 98 to any one of three positions. As best illustrated in FIGS. 30-32, Position A is for unfiltered spray, which is used for hot and cold water. Position B is for unfiltered stream, which is also used for hot and cold water. Position C is for filtered cold water only. Once the diverter valve 98 is confirmed to be in the correct position, position C, turn on and flush the system for at least 5 minutes.

In the event that the diverter valve 98 is set for filtered flow and the diverted flow appears to be slower than expected or there is no water flowing from the filtered water outlet, air may be trapped in the pleated membrane filtration media cartridge filter housing. To resolve this situation, insure that the incoming cold water flow is on and that the diverter valve 98 is set to the filtered water position. Locate the red colored pressure relief valve 131 button on the side to the pressure vessel 56 and push the button until water just begins to flow from the diverter valve 98 when set to the filtered water position. When water just begins to flow from the diverter valve 98, it indicates that the trapped air has been evacuated form the pressure vessel 56 and that the pressure vessel 56 is full of water. Filtered water should now flow normally from the diverter valve 98 when in the filtered water position.

As best illustrated in FIG. 33A and B, the multi component counter top water filtration system 50 includes an advanced system monitor 180. To test the monitor function, a user would press and hold the button 182 under the monitor 180 for about 6 seconds. The monitor 180 should cycle through all its light functions and emit a "beep" at the end of the cycle to indicate that the system 50 is functioning properly.

The interactive display on the face of the multi component counter top water filtration system 50 keeps a record of the remaining life in both the inner carbon filter cartridge (filter symbol 1), the outer pleated membrane filtration media cartridge (filter symbol 2) and the batteries, (2 AA). The display is only activated whenever water is running through the pressure vessel 56 of the system 50 or when the test button 182 (round button below the display) is pushed. When both of the filters are new, all lights for the filter symbol 1 and the filter symbol 2 will be illuminated on both sides as shown in FIG. 33B. Illuminated green lights indicate the amount of filtration capacity remaining in each of the respective filters.

Figure 36:
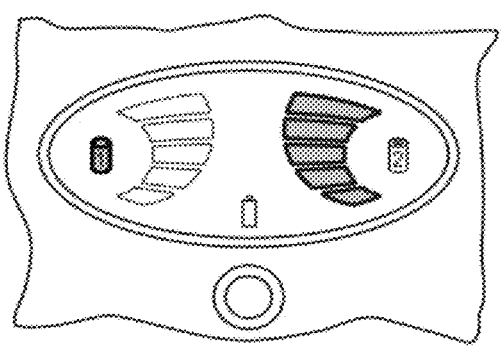
FIGS. 36A and B illustrate the display of viewable on the representative monitor that indicates that the inner carbon filter requires replacement.
Figure 37:
FIGS. 37 and 38 illustrate the procedure for removing carbon block filter cartridge from the pressure vessel of the multi component counter top water filtration system of the present disclosure.
Figure 38:
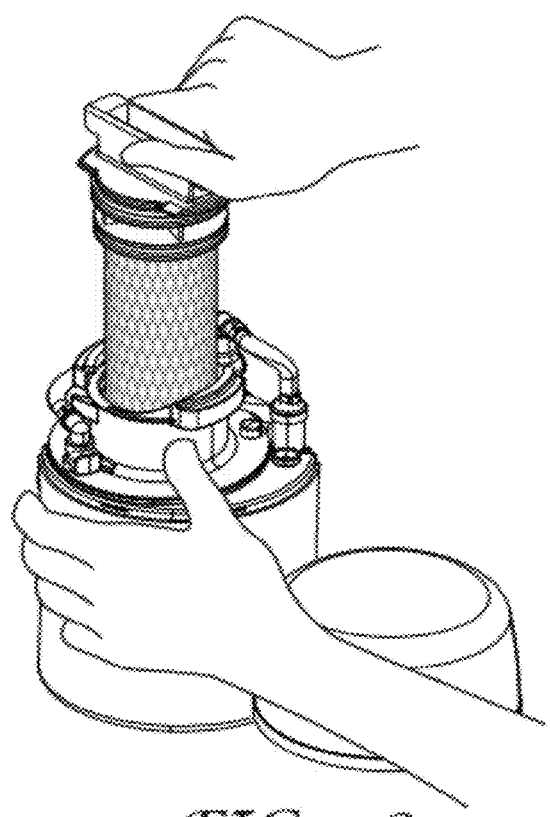

As filter capacity is diminished, the display for the inner carbon filter cartridge will change over a period of approximately 4 months or after the use of about 500 liters of water. The five green lights around the filter symbol 1 display will go out in sequence until only the symbol for the filter symbol 1 remains and flashes red, as best illustrated in FIG. 36 A. This red flashing display indicates that the inner carbon filter, the filter symbol 1, requires replacement. After each replacement of the inner carbon filter cartridge, one green light of the outer pleated membrane filtration media cartridge display will no longer illuminate during use with the exception of the first replacement. When the sixth carbon filter, inner carbon filter cartridge, has exhausted its useful life, all the green lights around the filter symbol 2 display will no longer illuminate during use and the filter symbol 2 will flash red, as best illustrated in FIG. 36B. At that time, the outer pleated membrane filtration media cartridge will require replacement along with the inner carbon filter cartridge, as represented in the following tables and in the Figures described above.

TABLE 1

| Liters consumed | Filter Symbol 1 - Number of Green Lights Displayed |
| --- | --- |
| 0 | 5 |
| 100 | 4 |
| 200 | 3 |

TABLE 1-continued

| Liters consumed | Filter Symbol 1 - Number of Green Lights Displayed |
| --- | --- |
| 300 | 2 |
| 400 | 1 |
| 500 | 0 (Filter 1 Icon blinks Red indicating that it is time to change filter) |

TABLE 2

| Liters Consumed | Filter Symbol 2 - Number of Green Lights Displayed |
| --- | --- |
| 0 | 5 |
| 500 | 5 |
| 1000 | 4 |
| 1500 | 3 |
| 2000 | 2 |
| 2500 | 1 |
| 3000 | 0 (Filter 2 Icon blinks Red indicating that it is time to change filter) |

The battery life indicator appears at the bottom center of the oval faceplate of the monitor 180. The indicator will not light under normal use except during a monitor 180 test cycle. The battery indicator will emit one red flash during the test cycle. As battery power is depleted and replacement is required, the indicator will blink red when the multi component counter top water filtration system 50 is dispensing water. The blinking red battery light indicates that the user has approximately 2 weeks to replace the batteries.

If necessary, the monitor 180 can be reset to the start position. Any history of water consumed and/or previous cartridge changes will be erased. To completely reset the monitor 180 to the start position, press both the test button 182 below the monitor 180 and the reset button 184 under the cover at the same time and hold for about 2 seconds until you hear a "beep". The monitor 180 circuitry will reset to 0 liters consumed and all green lights will be displayed.

Figure 39A:
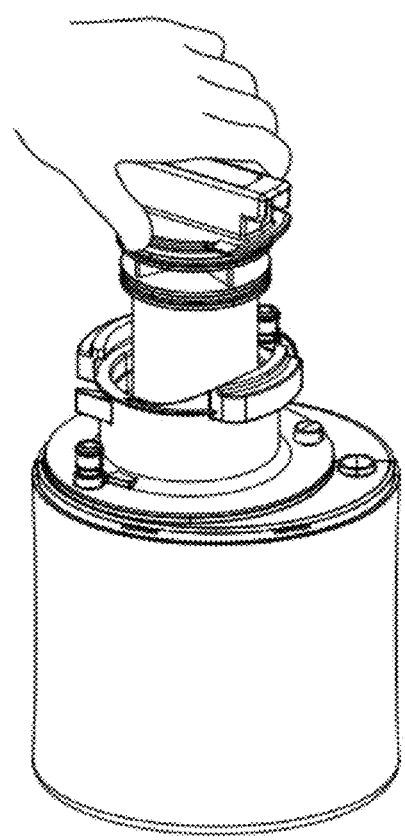
FIGS. 39A and B illustrates the procedure for reinserting the carbon block filter cartridge back into the pressure vessel of the multi component counter top water filtration system of the present disclosure.
Figure 39B:
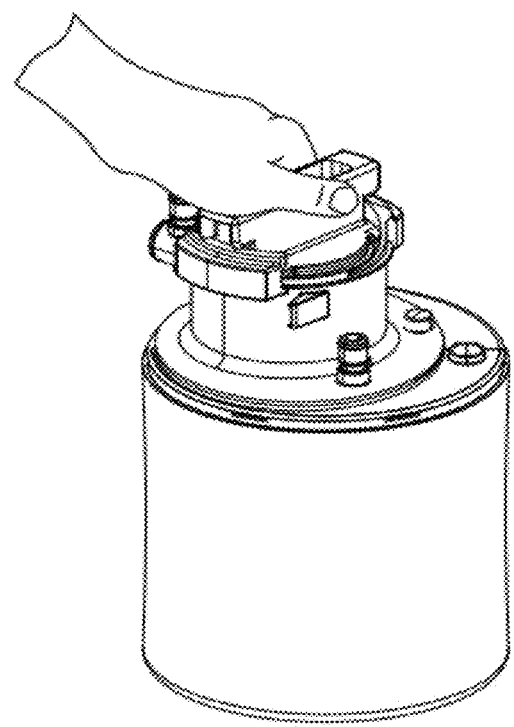

We will next discuss the procedure used to change the filters beginning with the interior or the first carbon black filter cartridge, as best illustrated in FIGS. 39A and B. When the filter symbol 1 is flashing red, it indicates that the inner carbon filter cartridge requires replacement, as shown in FIG. 36-B.

The inner carbon filter cartridge, when removed from the multi component counter top water filtration system 50, will be wet. To avoid the possibility of any water dripping onto the countertop, the multi component counter top water filtration system 50 should be placed in an empty sink or next to a sink. However, care should be taken to ensure that the upper housing 52 is not accidentally dropped. Further care should be taken to ensure that the upper housing 52 is never immersed in water or any liquid.

The inner carbon block filtration media cartridge 110 is located in the center the pressure vessel 56 and is identified by its swivel handle 160 which has a hole in the center. At this point, it should be noted that there is no need to touch the wet portion of the filter.

As best illustrated in FIGS. 39A and B, hold the pressure vessel 56 with one hand and turn the handle 160 of the cartridge counter-clock-wise. Lift the inner carbon block filtration media cartridge up and out of the pressure vessel 56. Be sure to empty any water remaining inside pressure vessel 56 and lower housing 54 by carefully inverting same over a sink before inserting a new inner carbon filter cartridge, in order to avoid possible overflow onto the counter during new filter cartridge installation.

Discard the used filter cartridge. Remove any protective sanitary wrapping from the new cartridge. Hold onto the handle 160 to avoid touching the filter cartridge itself. In reverse order of cartridge removal, insert the new cartridge into the pressure vessel 56 and push down and turn the handle 160 clockwise until the handle 160 stop is felt. At this point, the replacement cartridge is now installed.

Figure 40:
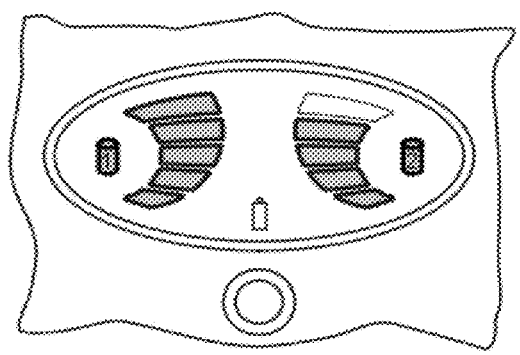
FIGS. 40A and B illustrate the display viewable on the interactive monitor after the reinsertion of the court to block filter cartridge into the pressure vessel of the multi component counter top water filtration system of the present disclosure.

Before replacing the upper housing 52, the interactive display must be reset to ensure the correct countdown for the next carbon filter cartridge change. The reset button 184 is located on the bottom of the upper housing 52. As best illustrated in FIG. 40 A and B, to reset the interactive display, push and hold the button 184 in until a "beep" is heard (approximately 3 seconds). At this time, the interactive display will be reset to begin the countdown for the filter symbol 1, the carbon filter cartridge, to be replaced for the second time. Subsequent replacements of the filter symbol 1 will be carried out in the same manner as the initial replacement.

After replacing the upper housing 52 and before resuming use of the multi component counter top water filtration system 50, flush water must be run through the replaced carbon block filtration media cartridge in order to remove any carbon residue and trapped air bubbles. During this process, the diverter valve 98 must be set to the filtered water position. Next, the multi component counter top water filtration system 50 is turned on and the system is flushed for at least 2 minutes.

Figure 41:
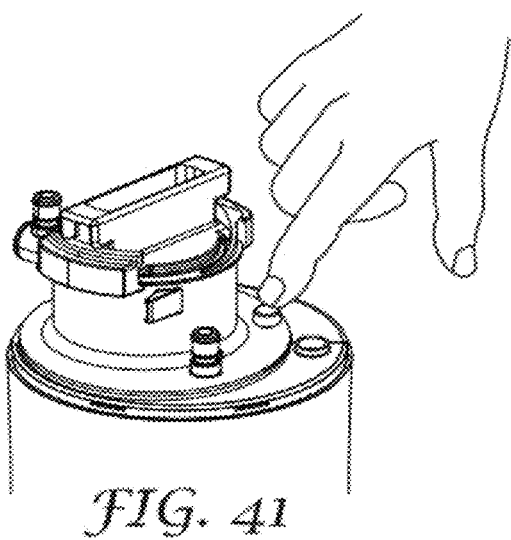
FIG. 41 illustrates the procedure for utilizing the pressure relief valve to remove any air that may be trapped in the pressure vessel in the vicinity of the pleated membrane filtration media cartridge of the multi component counter top water filtration system of the present disclosure.

As during initial installation, in the event that the diverter valve 98 is set for filtered flow and the divert flow appears to be slower than expected or there is no water flowing from the diverter, air may be trapped in the pleated membrane filtration media cartridge filter housing. As before, to resolve this problem, insure that the incoming cold water flow is on and that the diverter flow is set to filtered water. As best illustrated in FIG. 41, locate the red colored pressure relief valve 131 button on the side to the pressure vessel 56 and push the button until water just begins to flow from the diverter valve 98. When this occurs, it indicates that the trapped air has been evacuated form the pressure vessel 56 and that the pressure vessel 56 is full of water. Filtered water should now flow normally from the diverter valve 98.

At the end of this process, the re-set display now shows only 4 lights remaining around the filter symbol 2. This indicates that the countdown for the replacement of the outer pleated membrane filtration media cartridge has begun. When the sixth inner carbon filter cartridge has expired, all the lights around the filter symbol 2 will no longer illuminate during use and the filter symbol 2 will flash red. At that time, the outer pleated membrane filtration media cartridge will require replacement along with the inner carbon filter cartridge.

Figure 43:
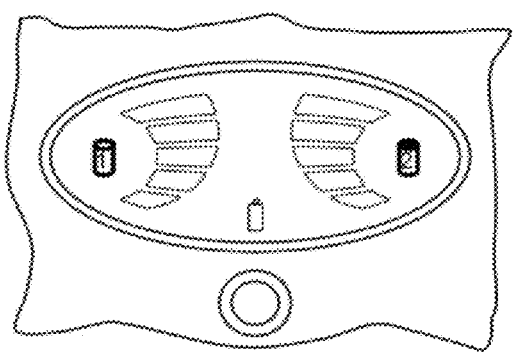
FIG. 43 illustrates the display viewable on the system monitored that indicates that both the carbon filter and the pleated membrane filtration media cartridges require replacement in the multi component counter top water filtration system of the present disclosure.

When the sixth inner carbon filter cartridge has expired, the interactive monitor 180 will alert the user that the outer pleated membrane filtration media cartridge also requires replacement. This should occur after approximately 2 years or after the consumption of about 3,000 liters of water. At that time, the monitor 180 will display both the filter symbol 1 and the filter symbol 2 symbols in red as shown in FIG. 43.

Outer pleated membrane filtration media cartridge replacement is somewhat similar to the inner carbon block filtration media cartridge replacement procedure. As mentioned above, in order to avoid the possibility of any water dripping onto your countertop, it is suggested that the end user place the multi component counter top water filtration system 50 in an empty sink or next to a sink. As with the initial filter replacement, remove the upper housing 52 from the lower housing 54 and set the upper housing 52 aside.

The end user will now be changing the inner carbon block filtration media cartridge at the same time the outer pleated membrane filtration media cartridge is being changed. The end user will remove both cartridges together as an assembly, the pressure vessel 56, from the lower housing 54. The carbon block filtration media cartridge is the filter that fits into the center of the pleated membrane filtration media cartridge housing portion of the pressure vessel 56. The lower housing 54 includes two hoses operatively attached thereto. These two hoses are disconnected by pressing the grey button on each coupling and lifting the couplings from the fittings. During this operation, care should be taken to also remove the longer tube from its push-in fitting under the base of the other coupling. At this point, make sure that both hoses are pushed aside and lift the complete pleated membrane filtration media cartridge/carbon block filtration media assembly/pressure vessel 56 out of the lower housing 54 of the multi component counter top water filtration system 50.

At this point, the exhausted filters should be properly discarded. The next step is to unwrap and otherwise prepare both new filters for use. Once accomplished, insert the new carbon block filtration media cartridge into the new pleated membrane filtration media cartridge filter housing portion of the pressure vessel 56, turn the carbon filter block filtration media cartridge handle 160 clockwise until one feels it stop, which completes the assembly of the new pressure vessel 56.

Figure 44D:
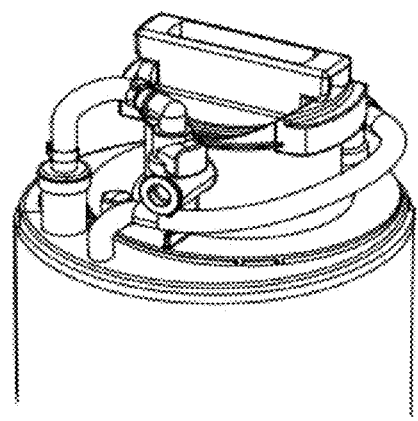
Figure 44E:
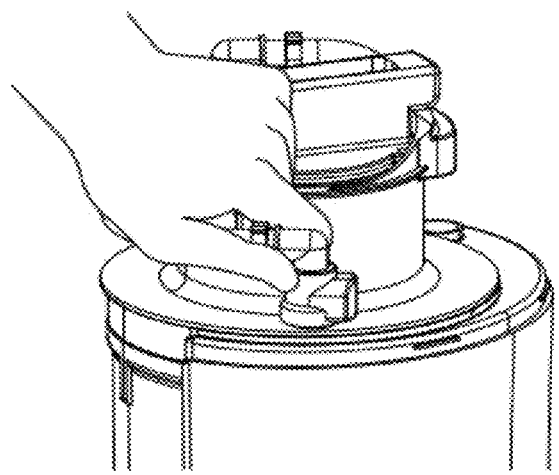
Figure 44F:
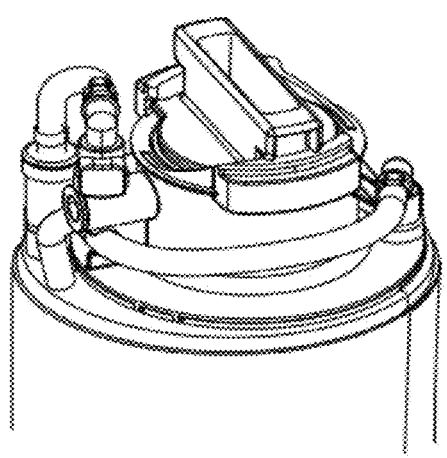

Before replacing the new assembly/pressure vessel 56, the two vertical ribs on the pleated membrane filtration media cartridge housing must align with the cut out in the opening of the lower housing 54 in order to allow the filter assembly/pressure vessel 56 to fit completely into the lower housing 54 of the multi component counter top water filtration system 50, as best illustrated in FIGS. 44A-C. During reassembly, these ribs should be lined up with the corresponding cut-out in the lower housing 54 of the multi component counter top water filtration system 50 and place the cartridge assembly/pressure vessel 56 into the lower housing 54 and position the hose back into the cut-out in the base of the fitting. At this point, both hoses are re-connected to their corresponding fittings by pushing the tube end couplings all the way down onto the housing fittings until they "click" in place, as best illustrated in FIGS. 45A-C.

Before replacing the upper housing 52, the user must reset the interactive display to ensure the correct countdown for the next two year sequence via the reset button 184 located on the bottom of the upper housing 52, as best illustrated in FIGS. 46A-B. In order to accomplish this, the user pushes and holds both the test and reset button 184 simultaneously until a "beep" is heard (approximately 3 seconds). At this point, the interactive display is reset to begin the countdown for both Filter 1 and Filter 2. Replace the upper housing 52 as before.

Before using the multi component counter top water filtration system 50 for the first time, the user must flush water through the replaced carbon filter cartridge and the replaced pleated membrane filtration media cartridge in order to remove any carbon residue and trapped air bubbles. While conducting the flush, be sure that the diverter valve 98 is set to the filtered water position. Once the diverter valve 98 is confirmed to be in the correct position, turn on and flush the system for at least 5 minutes as best illustrated in FIG. 47.

As during initial installation, in the event that the diverter valve 98 is set for filtered flow and the divert flow appears to be slower than expected or there is no water flowing from the diverter valve 98, air may be trapped in the pleated membrane filtration media cartridge filter housing. As before, to resolve this problem, insure that the incoming cold water flow is on and that the diverter flow is set to filtered water. Locate the red colored pressure relief valve 131 button on the side to the pressure vessel 56 and push the button until water just begins to flow from the diverter valve 98. When this occurs, it indicates that the trapped air has been evacuated form the pressure vessel 56 and that the pressure vessel 56 is full of water. Filtered water should now flow normally from the diverter valve 98.

Operation

Now that we have described the various components of the multi component counter top water filtration system 50 of the present disclosure and how an end user would place the system 50 in operation in the environment of use, we will know describe the operation of the multi component counter top water filtration system 50 of the present disclosure.

As best illustrated in FIG. 7, the diverter valve 98 is operatively connected to water source, such as, for example, a faucet (not shown). When the end user wants to filter water, the diverter valve is placed in the filter water position and water flows from the diverter valve to the pressure vessel via tubing 94. As best illustrated in FIG. 6, tubing 94 is routed inside of lower housing 54 and eventually to inlet 116, through outer cartridge 106 and inner cartridge 110 into hollow area 150 and out through outlet 128, as illustrated in FIG. 9.

Returning again to FIGS. 6 and 7, the filtered water exists the lower housing 54 via tubing 96 after passing through the component 67 housing magnet 82 and eventually exits' the diverter valve 98 via filtered water exit 170. The flow sensing sending component 67 is conventional and comprises an upper housing 190, a lower housing 192, the magnet 82, a spring 194, a spring retainer washer 196, a flow washer 198, a flow washer seat 200 and a metering piston 202. This flow sending sensing component operates in conjunction with the flow receiving sensing component in a conventional manner, as would be known to those skilled in the art.

Figure 9:
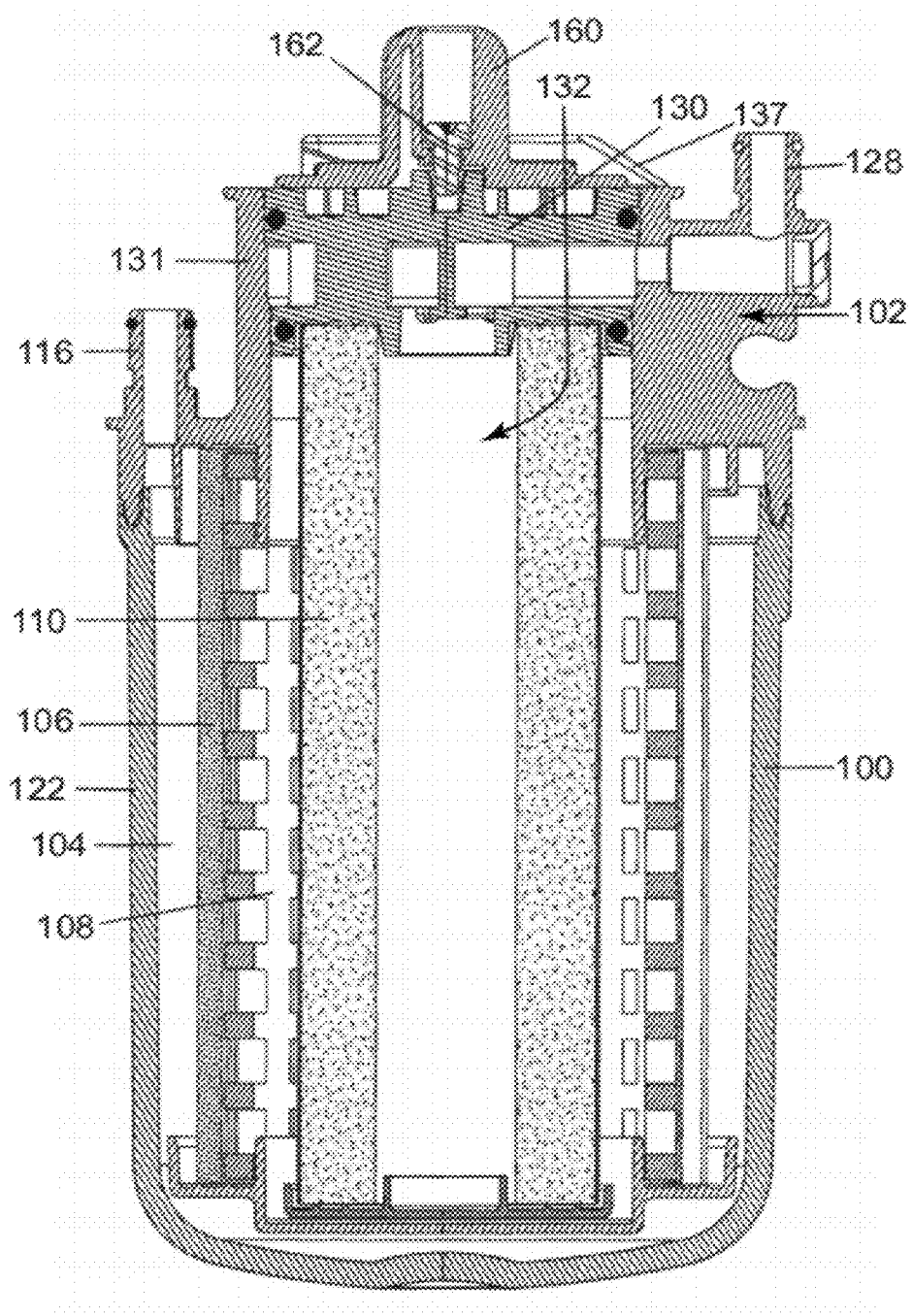
FIG. 9 is a cross sectional view taken all along line 9-9 of FIG. 8 of the representative pressure vessel of the multi component counter top water filtration system of FIG. 8.
Figure 10:
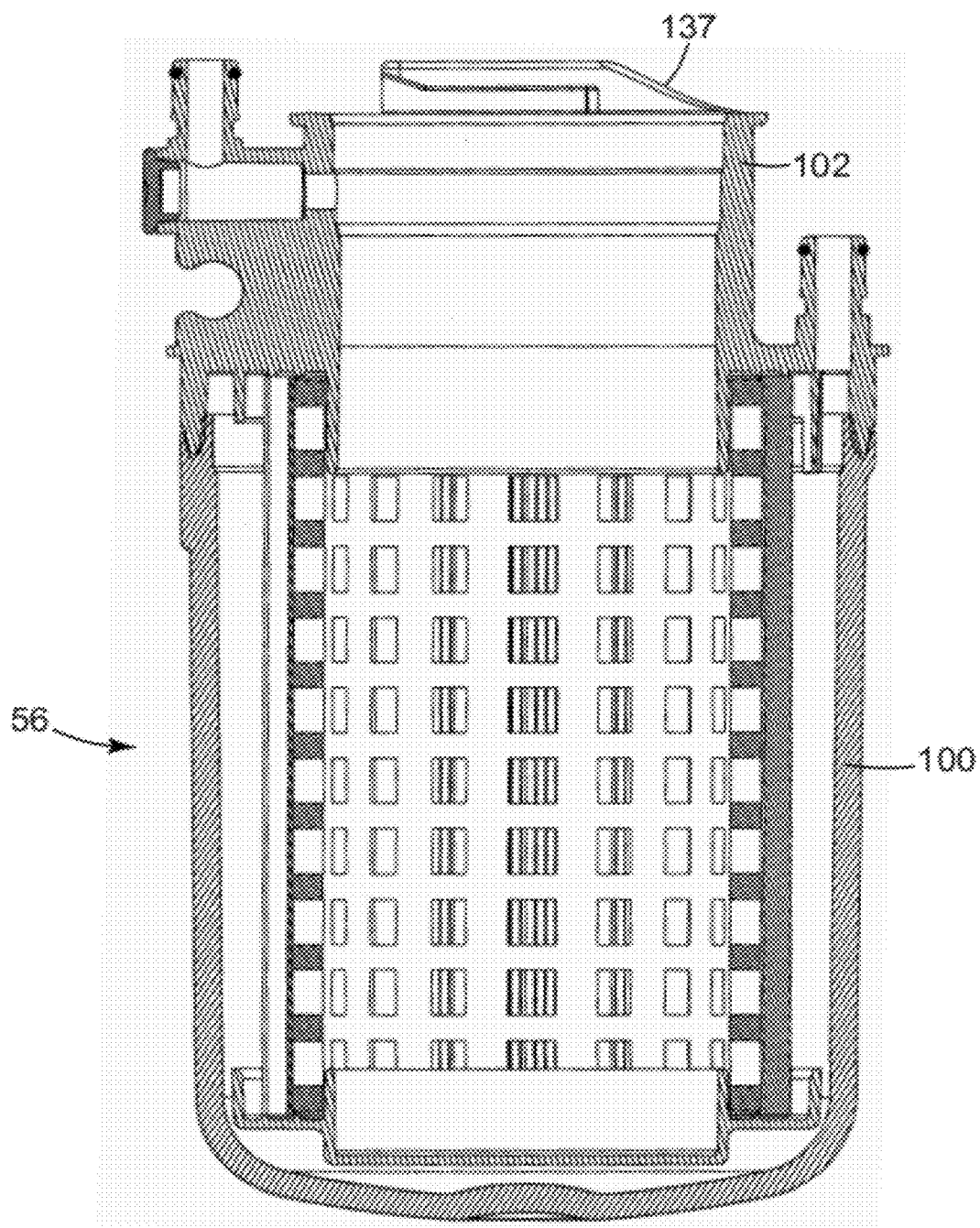
FIG. 10 is a partial cross sectional view similar to that of FIG. 9 but including the center core divider separating the filter media cartridges of the pressure vessel.
Figure 11:
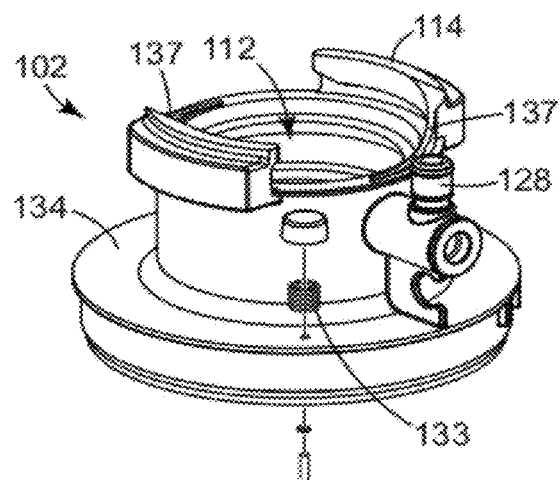
FIG. 11 is a perspective view of the upper portion of the pressure vessel of FIGS. 8-10.
Figure 12:
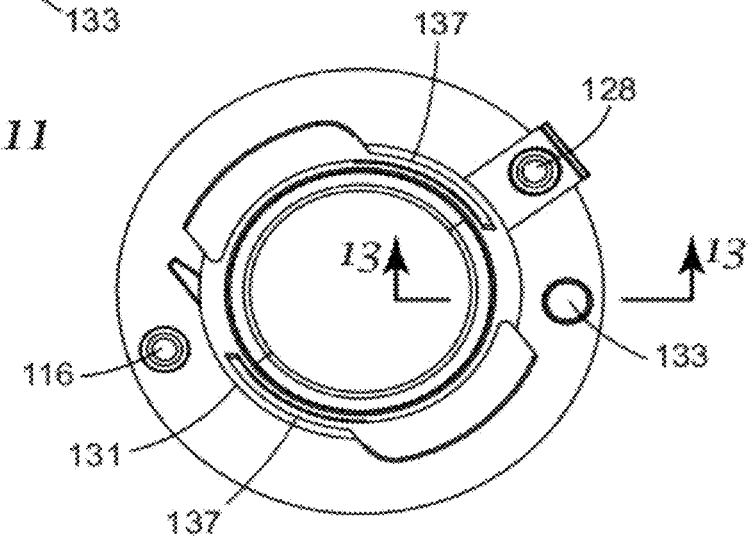
FIG. 12 is the top few of the upper portion of the pressure vessel of FIG. 11.
Figure 13:
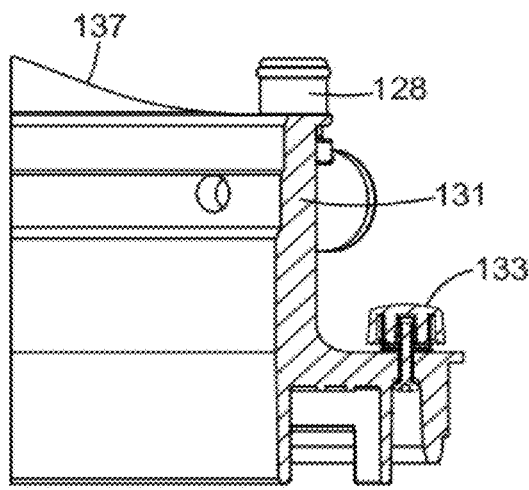
FIG. 13 is a cross-section of a representative pressure relief valve take along line 13-13 of FIG. 12.
Figure 14:
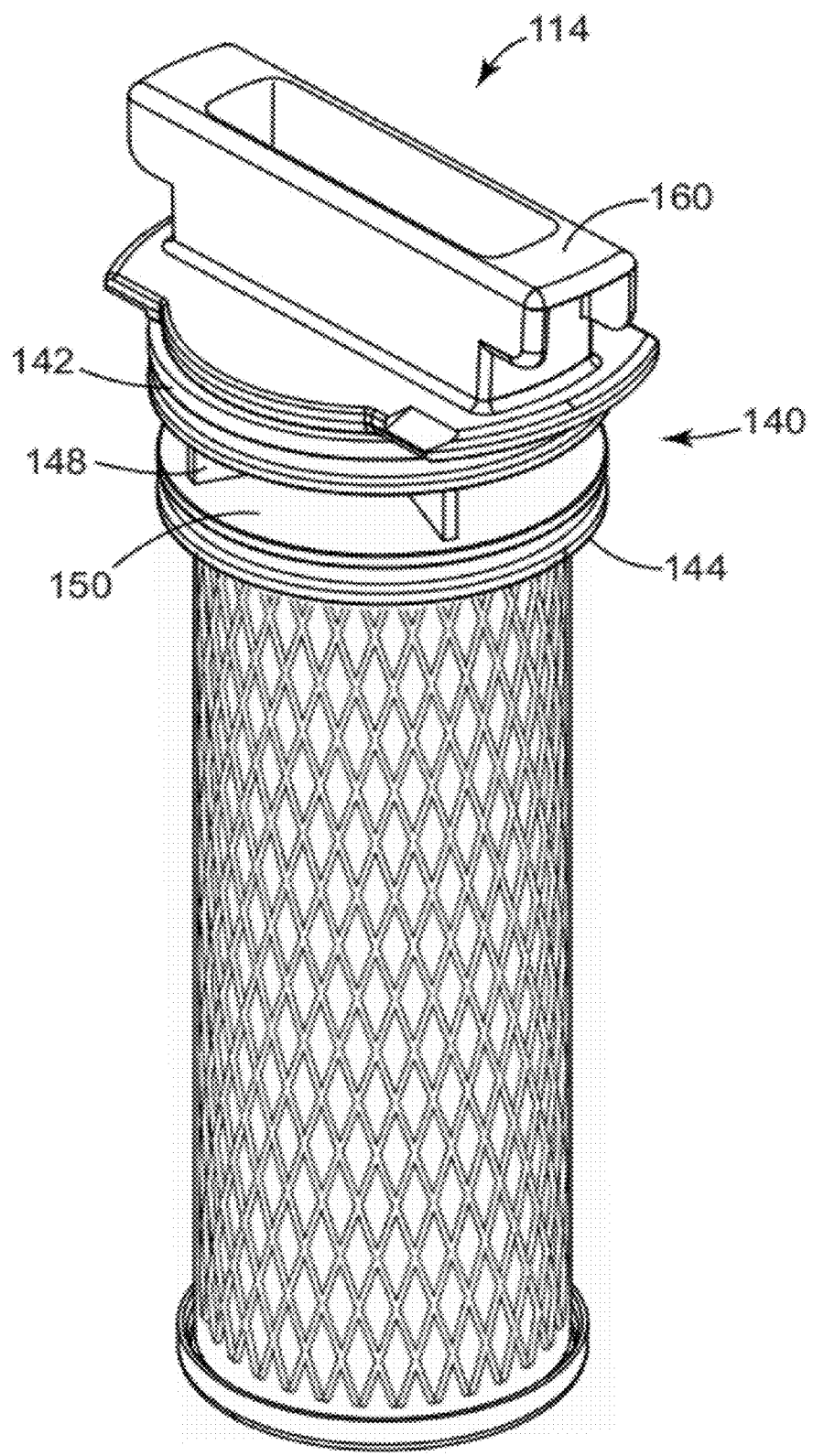
FIG. 14 is a perspective view of a representative inner filter cartridge assembly of the pressure vessel of the multi component counter top water filtration system of the present disclosure.
Figure 15:
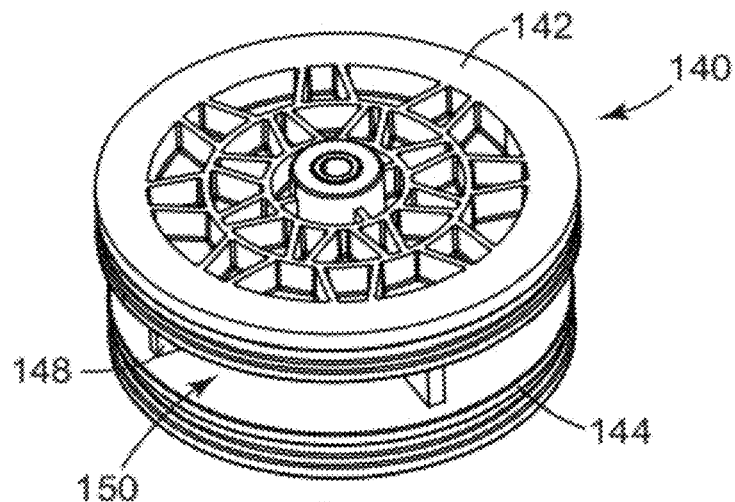
FIG. 15 is a perspective view of a representative new and innovative end cap for interaction with the inner filter cartridge for sealing the pressure vessel and for providing a path for filtered water out of the pressure vessel.
Figure 16:
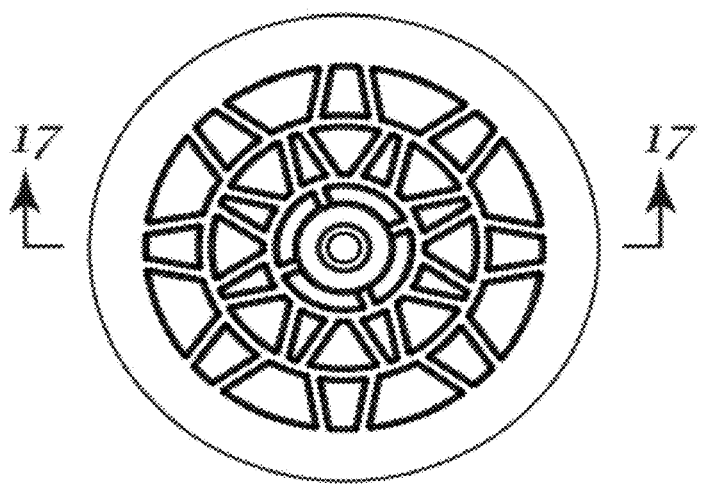
FIG. 16 is a top few of the representative end cap of FIG. 15.
Figure 17:
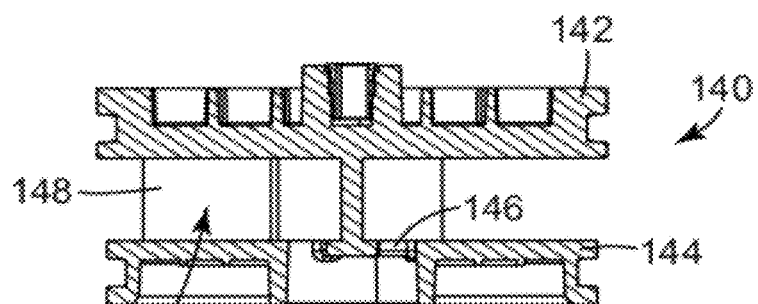
FIG. 17 is a cross sectional view of the end cap of FIG. 15 and 16 taken along lines 17-17 of FIG. 16.

The most recently developed embodiment of the present disclosure includes the relocation of the flow washer 198, as shown in FIG. 19, to the position 199, as now indicated in FIG. 9, as it has been determined that such relocation of the flow washer 198 results in a quieter operation of the multi component counter top water filtration system of the preset disclosure.

While the systems, articles, apparatus and methods for using and making the articles contained herein constitute preferred embodiments of the invention, it is to be understood that the invention is not limited to these precise articles, apparatus and methods, and that changes may be made therein without departing from the scope of the claims appended hereto.

What is claimed is:
1. A fluid filtration apparatus comprising:
a first housing;
a second housing;
electrical components, including a flow indication receiving device operatively positioned in the first housing and a flow indication signaling device operatively positioned in the second housing, the first housing being removable from the second housing without disconnecting an electronic connection;
a pressure vessel having an inlet and an outlet, and a removable center core assembly having a handle and being operatively positioned in the second housing by rotational engagement of the handle with a removal ramp on the pressure vessel, the pressure vessel comprising:
a greater useful life filtration media operatively positioned in the pressure vessel; and a lower useful life filtration media operatively positioned on the removable center core assembly to provide for removal of the lower useful life filtration media from the pressure vessel with the removable center core assembly while leaving the greater useful life filtration media in the pressure vessel; and plumbing components for operatively connecting a fluid supply to the inlet of the pressure vessel; and at least one filtered fluid delivery structure for operatively connecting the pressure vessel to the outlet of the pressure vessel.

2. The fluid filtration apparatus of claim 1 further comprising:

a reed switch operatively positioned in the first housing; and a magnet being operatively positioned in the second housing wherein the reed switch and the magnet operatively cooperate.

3. The fluid filtration apparatus of claim 1 wherein the filtered fluid delivery structure further comprises:

a selectable position diverter valve for selectively routing water from the water supply to the pressure vessel and back to the selectable positioned diverter valve through the plumbing components.

4. The fluid filtration apparatus of claim 1 wherein the pressure vessel further comprises:

a first pressure element; and a second pressure element, the first and second pressure elements being operatively connected.

5. The fluid filtration apparatus of claim 4 wherein the first pressure element comprises:

a first outer hollow area for encasing the greater useful life filtration media; and a second hollow area interior of the outer hollow area for removably receiving the removable center core assembly and lower useful life filtration media.

6. The fluid filtration apparatus of claim 5 wherein the greater useful life filtration media comprises a pleated membrane filtration media cartridge; and the lower useful life filtration media comprises a carbon block filtration media cartridge.

7. The fluid filtration apparatus of claim 6 wherein the carbon block filtration media cartridge has a useful life of about 4 months.

8. The fluid filtration apparatus of claim 6 wherein the pleated membrane filtration media cartridge has useful life for as much as 2 years.

9. An apparatus for reducing the breakout force required to remove an installed filter media cartridge, the apparatus comprising:

a sealing end cap with an O-Ring seal;

a handle attached to and rotatable with respect to the sealing end cap by an operative connection between the handle and the sealing end cap wherein the operative connection comprises a swivel joint; and the filter media cartridge comprising a removal ramp having a cam profile, the cam profile comprising a shallow portion and a steeper portion for removing the filtration media cartridge such that rotation of the handle engages the removal ramp to cause translation, but not rotation, of the O-Ring seal.

10. A method for disengaging an installed filter media cartridge from a filtration system comprising the acts of:

providing an apparatus for reducing the breakout force required to remove an installed filter media cartridge, the apparatus comprising:

a sealing end cap with O-Ring seals;

a handle; and a swiveling joint, separate from but operatively connected to the handle, for removing the filtration media cartridge such that the O-Ring seals are disengaged without rotation and wherein the two force components required to remove the filtration media cartridge are effectively reduced to a translation force component;

providing filter media cartridge removal ramps having a cam profile which is initially very shallow;

rotating the handle with respect to the end cap such that the handle engages the filter media cartridge removal ramps while the end cap remains in place in the operating position; and continuing to rotate the handle such that the end cap starts to translate due to the removal ramps such that the end cap follows the handle in the translation.

11. A method for installing an installed filter media cartridge into a filtration system comprising the acts of:

providing an apparatus for reducing the breakout force required to remove an installed filter media cartridge, the apparatus comprising:

a sealing end cap with O-Ring seals;

a handle; and a swiveling joint, separate from but operatively connected to the handle, for removing the filtration media cartridge such that the O-Ring seals are disengaged without rotation and wherein the two force components required to remove the filtration media cartridge are effectively reduced to a translation force component;

providing filter media cartridge removal ramps having a cam profile which is initially very shallow;

inserting the filter media cartridge into the operating position in the system; and rotating the handle with respect to the end cap, which does not rotate during installation, such that the handle engages the filter media cartridge removal ramps thereby reducing the effort required to accomplish installation.

* * * * *

UNITED STATES PATENT AND TRADEMARK OFFICE
CERTIFICATE OF CORRECTION

PATENT NO. : 8,216,466 B2
APPLICATION NO. : 11/239607
DATED : July 10, 2012
INVENTOR(S) : Laurence W Bassett It is certified that error appears in the above-identified patent and that said Letters Patent is hereby corrected as shown below:

On the Title Page, in Column 2, under (Abstract)
Line 6, delete "o-rings" and insert -- O-rings --, therefor.

Column 1
Line 6, delete "is a continuation-in-part" and insert -- claims priority --, therefor.

Column 3
Line 44, delete "Psuedonomas" and insert -- Pseudomonas --, therefor.

Column 4
Line 1, delete "more then" and insert -- more than --, therefor.

Column 5
Line 60, delete "disclosure" and insert -- disclosure; --, therefor.
Line 65, delete "the a" and insert -- a --, therefor.

Figure 33:
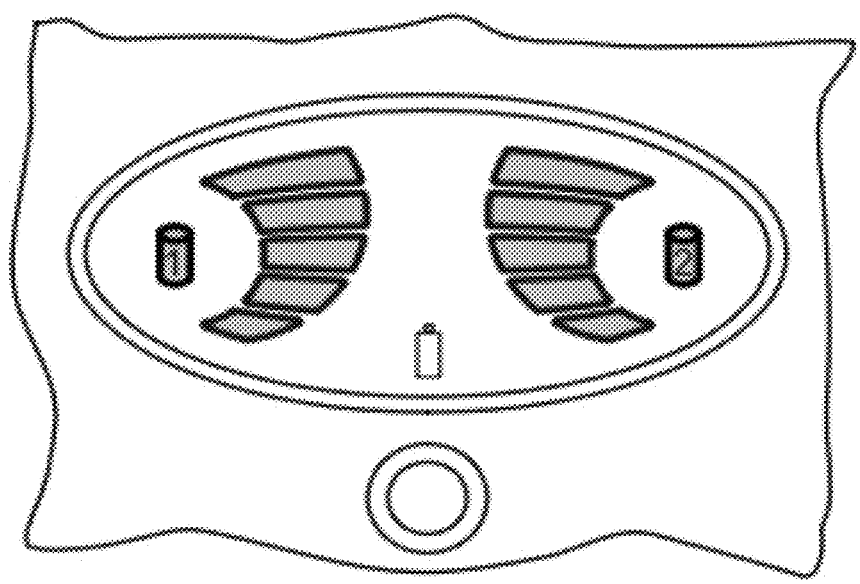
FIGS. 33A and B illustrate the interactive display of the system monitor in the activated condition which indicates that water is running thru the system or the test button has been pushed and indicates the capacity remaining in each of the filters of the multi component counter top water filtration system of the present disclosure.
Figure 34:
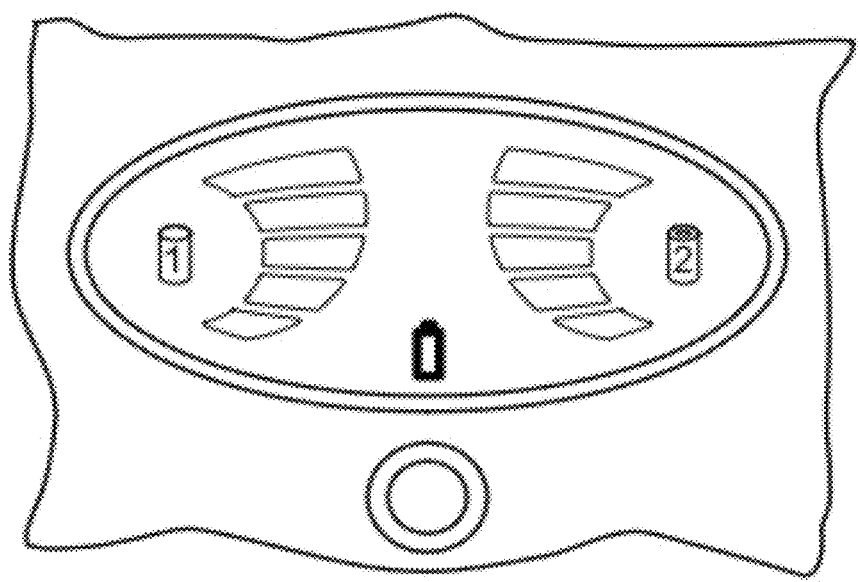
FIG. 34 illustrates the battery life indicator blinking indicating that there is approximately two weeks of battery life remaining in the representative system monitor of the multi component counter top water filtration system of the present disclosure.
Figures 35A, 35B:
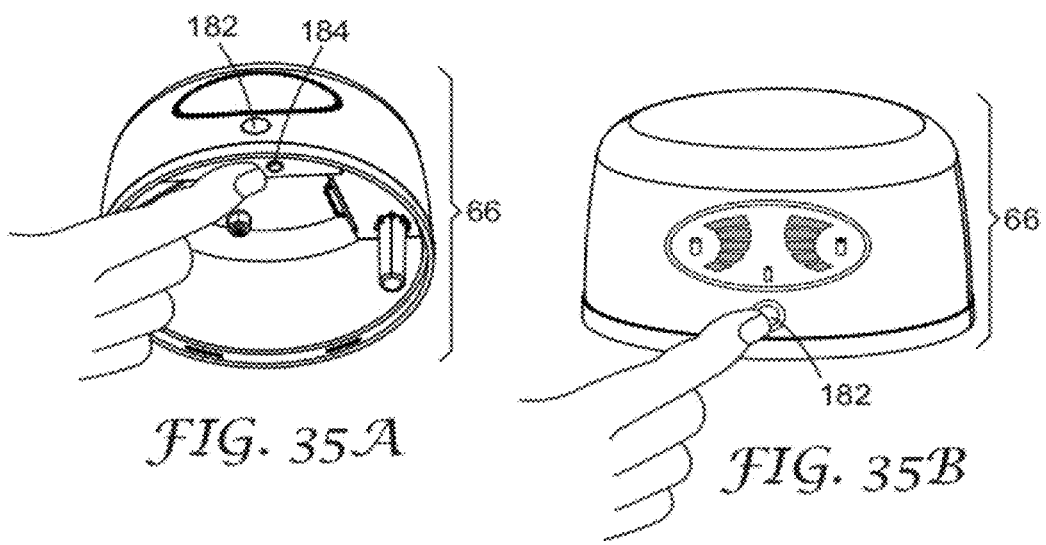
FIGS. 35A and B illustrate the method for resetting the representative monitor to the start position by pressing the test button below the monitor and the reset button under the upper housing simultaneously such that all lights are illuminated of the multi component counter top water filtration system of the present disclosure.
Figure 42:
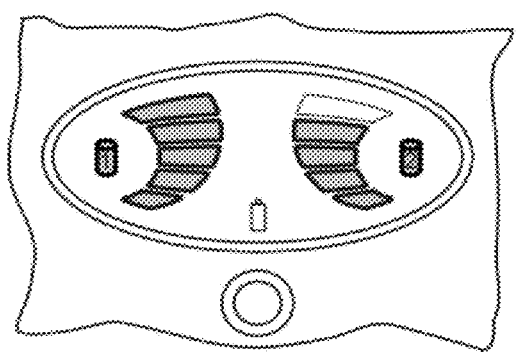
FIGS. 42A and B illustrate the display viewable on the system monitor that indicates that the countdown for replacement of the pleated membrane filtration media cartridge has begun for the multi component counter top water filtration system of the present disclosure.

Column 7
Line 18, delete "FIGS. 33A and B illustrate" and insert -- FIG. 33 illustrates --, therefor.
Line 36, delete "FIGS. 36A and B illustrate" and insert -- FIG. 36 illustrates --, therefor.
Line 47, delete "FIGS. 40A and B illustrate" and insert -- FIG. 40 illustrates --, therefor.
Line 56, delete "FIGS. 42A and B illustrate" and insert -- FIG. 42 illustrates --, therefor.

Column 8
Line 4, delete "FIGS. 45A in the illustrate" and insert -- FIGS. 45A and B illustrate --, therefor.

Column 12
Lines 50-51, delete "some what" and insert -- somewhat --, therefor.

Signed and Sealed this
Sixth Day of November, 2012

David J. Kappos
*Director of the United States Patent and Trademark Office*

Column 13
Line 21, delete "of 25" and insert -- of --, therefor.
Line 21, delete "20 in*lbs." and insert -- 20 in˙lbs --, therefor.

Column 14
Line 63, delete "button" and insert -- test button --, therefor.
Line 66, delete "the the" and insert -- the --, therefor.

Column 15
Line 61, delete "10" and insert -- 110 --, therefor.

Column 16
Line 19, delete "form" and insert -- from --, therefor.
Line 22, delete "FIG. 33A and B," and insert -- FIG. 33, --, therefor.
Line 25, delete "button" and insert -- test button --, therefor.
Lines 38-39, delete "FIG. 33B." and insert -- FIG. 33. --, therefor.
Line 46, delete "FIG. 36A." and insert -- FIG. 36. --, therefor.
Line 56, delete "FIG. 36B." and insert -- FIG. 36. --, therefor.

Column 17
Lines 43-44, delete "FIG. 36-B." and insert -- FIG. 36. --, therefor.

Column 18
Line 12, delete "FIG. 40A and B," and insert -- FIG. 40, --, therefor.
Line 13, delete "button" and insert -- reset button --, therefor.
Line 38, delete "form" and insert -- from --, therefor.

Column 19
Line 40, delete "FIGS. 45A-C." and insert -- FIGS. 45A-B. --, therefor.
Lines 44-45, delete "FIGS. 46A-B." and insert -- FIGS. 45A-B. --, therefor.

Column 20
Line 2, delete "form" and insert -- from --, therefor.